(12) United States Patent
Ito

(10) Patent No.: US 12,382,200 B2
(45) Date of Patent: Aug. 5, 2025

(54) IMAGE CAPTURING CIRCUIT THAT CAN BE APPLIED TO IMAGE CAPTURING APPARATUS

(71) Applicant: CANON KABUSHIKI KAISHA, Tokyo (JP)

(72) Inventor: Shigeyoshi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/155,206

(22) Filed: Jan. 17, 2023

(65) Prior Publication Data
US 2023/0232126 A1 Jul. 20, 2023

(30) Foreign Application Priority Data

Jan. 20, 2022 (JP) ................................ 2022-007149

(51) Int. Cl.
  *H04N 25/78* (2023.01)
  *G06T 3/4053* (2024.01)
  *H04N 25/42* (2023.01)

(52) U.S. Cl.
CPC ........... *H04N 25/78* (2023.01); *G06T 3/4053* (2013.01); *H04N 25/42* (2023.01)

(58) Field of Classification Search
CPC ...... H04N 25/42; H04N 25/78; G06T 1/0007; G06T 3/40; G06T 3/4053
See application file for complete search history.

(56) References Cited

U.S. PATENT DOCUMENTS

| 2009/0219423 A1* | 9/2009 | Suzuki | H04N 25/704 |
| | | | 348/E5.091 |
| 2021/0274110 A1* | 9/2021 | Sambonsugi | H04N 25/00 |
| 2022/0279141 A1* | 9/2022 | Ito | H04N 23/75 |

FOREIGN PATENT DOCUMENTS

| JP | 2009130582 A | 6/2009 |
| JP | 2021-129321 A | 9/2021 |
| JP | 2022131605 A | 9/2022 |

OTHER PUBLICATIONS

The above foreign patent documents were cited in the Jun. 4, 2024 Japanese Office Action, which is enclosed without an English Translation, that issued in Japanese Patent Application No. 2022-007149.

* cited by examiner

*Primary Examiner* — Lin Ye
*Assistant Examiner* — Chriss S Yoder, III
(74) *Attorney, Agent, or Firm* — Cowan, Liebowitz & Latman, P.C.

(57) ABSTRACT

An image capturing circuit that can be applied to an image capturing apparatus, including a pixel array having photo-electric conversion elements arranged in a matrix, a row selection circuit capable of reading out still image data with a first resolution and LV moving image data with a second resolution lower than the first resolution from the pixel array, an image memory for storing the read still image data and the read LV moving image data, and a reduction circuit that converts the still image data to reduced image data with a third resolution lower than the first resolution. The still image data is read out from the memory and output after converted to the reduced still image data, and the still image data is also output without being converted. The LV moving image data is read out from the memory and output without being converted.

7 Claims, 27 Drawing Sheets

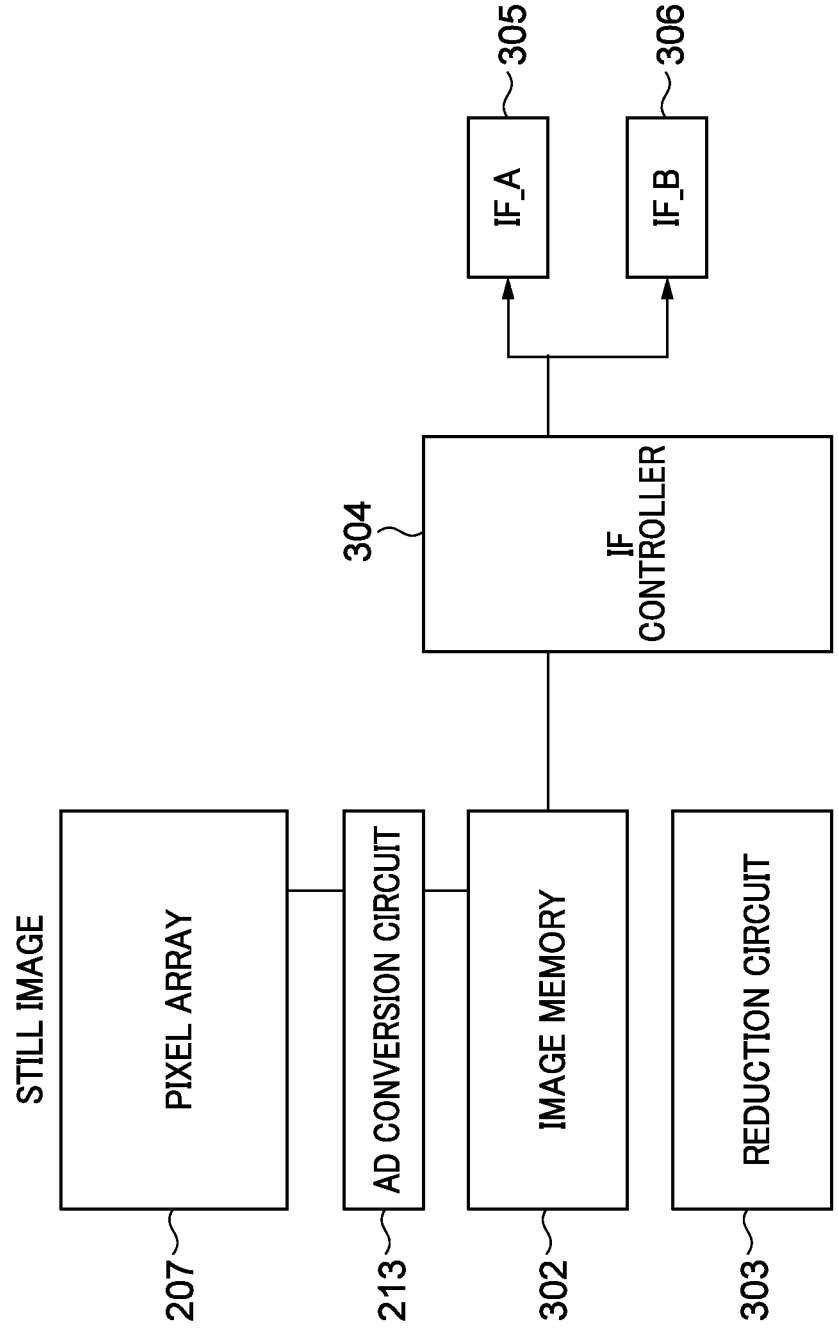

IMAGE CAPTURING CIRCUIT THAT CAN BE APPLIED TO IMAGE CAPTURING APPARATUS

BACKGROUND OF THE INVENTION

Field of the Invention

The present invention relates to an image capturing circuit that can be applied to an image capturing apparatus.

Description of the Related Art

Digital cameras and electronic apparatuses equipped with a camera function (hereinafter generically referred to as "image capturing apparatuses") include one having a "live view function (LV function)". The "LV function" refers to a function of displaying a captured image on a display section while capturing a moving image or the like. A user can adjust a photographing range of still image photographing or moving image photographing while confirming a moving image displayed by the live view function (hereinafter this photographing range adjustment operation is referred to as the "framing").

To enable a user to perform photographing as intended by the user, the easiness of framing is important (an index of easiness of framing is referred to as the "framing performance"). For example, in a case where the user photographs a still image while photographing a moving image, the moving image cannot be acquired at a frame at which the still image is photographed. In this case, an image to be displayed using the live view function cannot be acquired, and hence the framing performance is lowered. To avoid lowering of the framing performance, it is important to execute processing for preventing frame loss even when a still image is photographed.

For example, a technique disclosed in Japanese Laid-Open Patent Publication (Kokai) No. 2021-129321 discloses that by displaying a photographed still image in a reduced state in one frame of the live view moving image being photographed, processing for preventing occurrence of frame loss in a live view moving image is executed.

However, the technique disclosed in Japanese Laid-Open Patent Publication (Kokai) No. 2021-129321 has a problem that when the still image is converted to the moving image, the still image is once stored in a memory and then converted, and hence delay of a certain time is necessarily caused when the reduced still image is displayed. On the other hand, for example, for a camera that aims at photographing e.g. a sports scene, it is important to reduce the display delay. Thus, according to a plurality of purposes of use of the image capturing apparatus, there are a plurality of types of processing for displaying a still image in a reduced stare.

SUMMARY OF THE INVENTION

The present invention provides an image capturing circuit that is capable of taking an optimum image data path according to each of a plurality of purposes of use and thereby obtaining a live view image.

In a first aspect of the present invention, there is provided an image capturing circuit that can be applied to an image capturing apparatus, including a pixel array configured to have a plurality of photoelectric conversion elements arranged in a matrix, a readout section configured to be capable of reading out first image data with a first resolution and second image data with a second resolution lower than the first resolution from the pixel array, a memory configured to store the read first image data and the read second image data, and a conversion section configured to convert the first image data read out by the readout section to third image data with a third resolution lower than the first resolution, wherein the image capturing circuit performs an operation of reading out the first image data from the memory and outputting the first image data after converting the first image data to the third image data using the conversion section, and an operation of outputting the first image data without converting the first image data to the third image data, and wherein the image capturing circuit performs an operation of reading out the second image data from the memory and outputting the second image data without converting the second image data to the third image data.

In a second aspect of the present invention, there is provided an image capturing circuit that can be applied to an image capturing apparatus, including a pixel array configured to have a plurality of photoelectric conversion elements arranged in a matrix, a readout section configured to be capable of reading out first image data with a first resolution and second image data with a second resolution lower than the first resolution from the pixel array, a memory configured to store the read first image data, and a conversion section configured to convers the first image data read out by the readout section to third image data with a third resolution lower than the first resolution, wherein the image capturing circuit performs an operation of reading out the first image data from the memory and outputting the first image data after converting the first image data to the third image data using the conversion section, and an operation of outputting the first image data without converting the first image data to the third image data, and wherein the image capturing circuit performs an operation of outputting the second image data without storing the second image data in the memory.

In a third aspect of the present invention, there is provided an image capturing circuit that can be applied to an image capturing apparatus, including a pixel array configured to have a plurality of photoelectric conversion elements arranged in a matrix, a readout section configured to be capable of reading out first image data with a first resolution and second image data with a second resolution lower than the first resolution from the pixel array, a memory configured to store the read first image data, and a conversion section configured to convert the first image data read out by the readout section to third image data with a third resolution lower than the first resolution, wherein the image capturing circuit performs an operation of inputting the first image data to the conversion section while simultaneously writing the first image data into the memory, and reading out the first image data from the memory to output the read first image data, and wherein the image capturing circuit performs an operation of outputting the second image data and the third image data without writing the second image data and the third image data into the memory.

According to the present invention, it is possible to obtain an advantageous effect of making it possible to provide an image capturing circuit that is capable of taking an optimum image data path according to each of a plurality of purposes of use and thereby obtaining a live view image.

Further features of the present invention will become apparent from the following description of exemplary embodiments (with reference to the attached drawings).

BRIEF DESCRIPTION OF THE DRAWINGS

FIG. 7A is a schematic explanatory diagram of data paths for a still image in an image capturing circuit according to a second embodiment.

DESCRIPTION OF THE EMBODIMENTS

The present invention will now be described in detail below with reference to the accompanying drawings showing embodiments thereof. However, configurations described in the following embodiments are described only by way of example, and are by no means intended to limit the scope of the present invention. First, a first embodiment of the present invention will be described.

Figure 1:
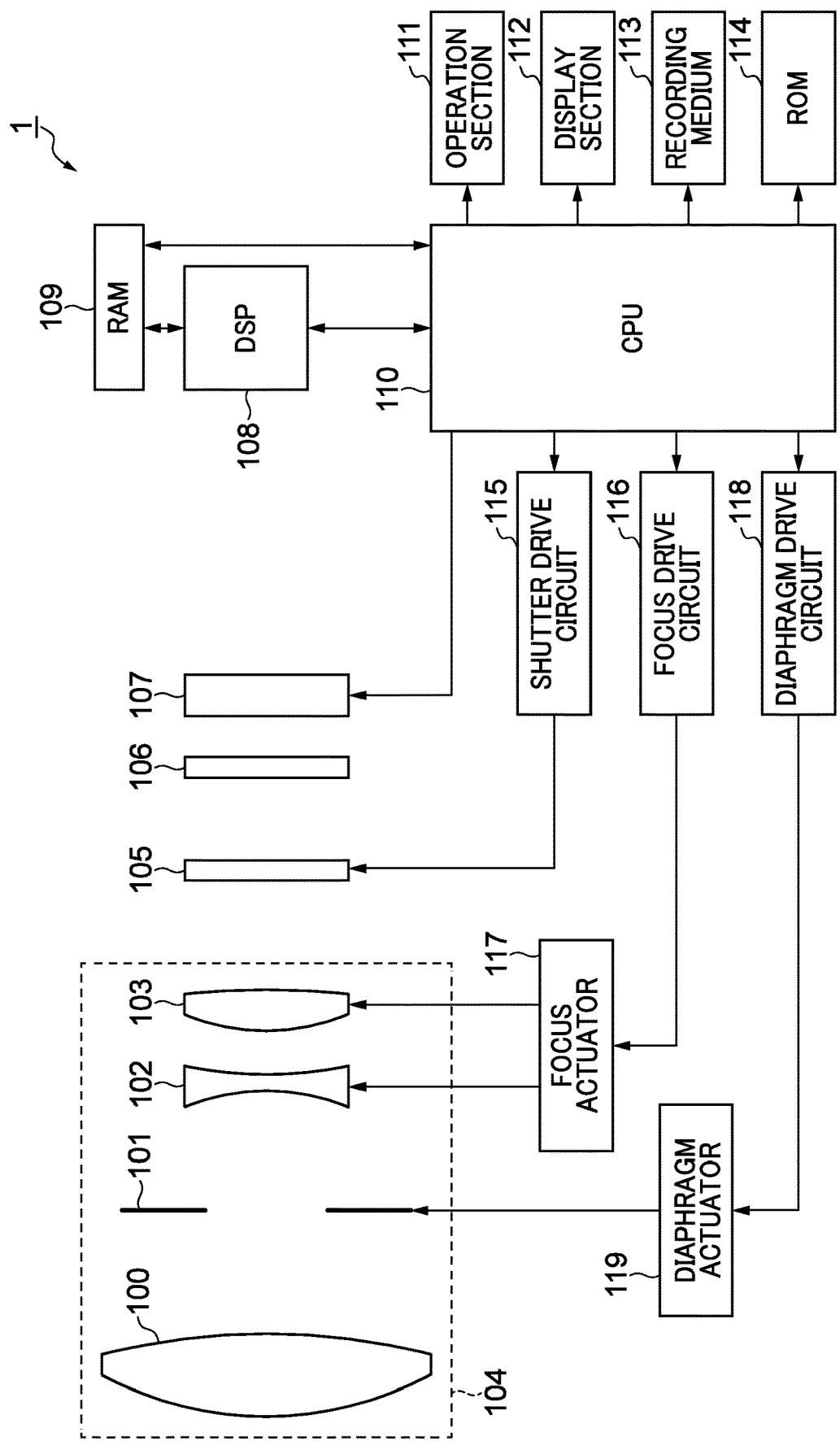
FIG. 1 is a block diagram of an image capturing apparatus equipped with an image capturing circuit according to a first embodiment.

FIG. 1 is a block diagram of an image capturing apparatus 1 equipped with an image capturing circuit according to the first embodiment of the present invention. As shown in FIG. 1, the image capturing apparatus 1 has an image capturing optical system 104. The image capturing optical system 104 includes a first lens 100, a diaphragm 101, a second lens 102, and a third lens 103. The first lens 100 is disposed at a front end of the image capturing optical system 104. The diaphragm 101 adjusts the amount of light during photographing by adjusting its aperture diameter. The diaphragm 101 is driven by a diaphragm actuator 119 to adjust the aperture diameter. The second lens 102 and the third lens 103 are driven by a focus actuator 117, referred to hereinafter, to advance and retreat in an optical axis direction to thereby adjust the focus of the image capturing optical system 104.

On a rear side of the image capturing optical system 104, there are arranged a focal plane shutter 105, an optical lowpass filter 106, and an image sensor 107 in the mentioned order. The focal plane shutter 105 has a function of adjusting the exposure time when a still image is photographed. The optical lowpass filter 106 has a function of reducing false colors and moire in a photographed image. The image sensor 107 photoelectrically converts an optical image of an object, captured by the image capturing optical system 104, to electrical signals.

The image capturing apparatus 1 is equipped with electronic devices, such as a central processing unit (CPU) 110, a digital signal processor (DSP) 108, and a random access memory (RAM) 109. The DSP 108 performs reception of image data and image processing. Examples of the image processing performed by the DSP 108 include generation of display image data to be displayed on a display section 112 from image data of a still image. Further, the DSP 108 performs not only the image processing, but also calculation of information used for driving focus lenses (the second lens 102 and the third lens 103) based on information received from the image sensor 107. The RAM 109 has a function of image data-storing means for storing image data processed by the DSP 108 and a function of a work memory for the operation of the CPU 110, described hereinafter. Note that although in the present embodiment, both of the functions are realized by using the RAM 109, any other type of memory can be used insofar as it is a memory that has a sufficiently high access speed and no operational problem. Further, although in the present embodiment, the RAM 109 is disposed outside the DSP 108 and the CPU 110, part or all of the functions of the RAM 109 may be equipped in the DSP 108 or the CPU 110. That is, a processor can be used which has a structure in which a dedicated RAM is equipped in the DSP 108 or the CPU 110.

The CPU 110 performs centralized control of the image capturing apparatus 1. The CPU 110 executes programs for controlling the components of the image capturing apparatus 1. The CPU 110 has a function of controlling the timing of photographing a moving image and the timing of photographing a still image, described hereinafter, by making a variety of settings of the image sensor 107. Further, the CPU 110 also has a function of adjusting the focus of the image capturing optical system 104 by controlling the driving of a focus drive circuit 116, described hereinafter, by using calculation results output from the DSP 108.

To the CPU 110, an operation section 111, the display section 112, a recording medium 113, a read only memory (ROM) 114, a shutter drive circuit 115, the focus drive circuit 116, and a diaphragm drive circuit 118 are connected. The operation section 111 is comprised of manipulators, such as buttons and levers. By operating the operation section 111, a user controls the CPU 110 to perform photographing. The operation section 111 includes a still image-photographing start button. When the CPU 110 detects a user's operation of pressing the still image-photographing start button, the CPU 110 performs photographing of a still image when a predetermined time period elapses after the detection. The display section 112 displays a still image and a moving image, processed by the DSP 108, a menu, and so forth. As the display section 112, instead of a display, an electronic viewfinder (EVF) or the like may be used. The recording medium 113 is a removable recording medium that records still image data and moving image data, and can be implemented by e.g. a memory card. The ROM 114 stores programs executed by the CPU 110 to control the operations of the components.

The shutter drive circuit 115 controls the driving of the focal plane shutter 105. The focus drive circuit 116 functions as focus position-changing means for changing a focus position of the image capturing optical system 104. Based on an output from the CPU 110, the focus drive circuit 116 controls the driving of the focus actuator 117 to move the focus lens (the second lens 102 and the third lens 103) in an advancing or retreating direction along the optical axis, to thereby perform focus adjustment. The diaphragm drive circuit 118 controls the driving of the diaphragm actuator 119 to thereby control the aperture of the diaphragm 101.

Figure 2A:
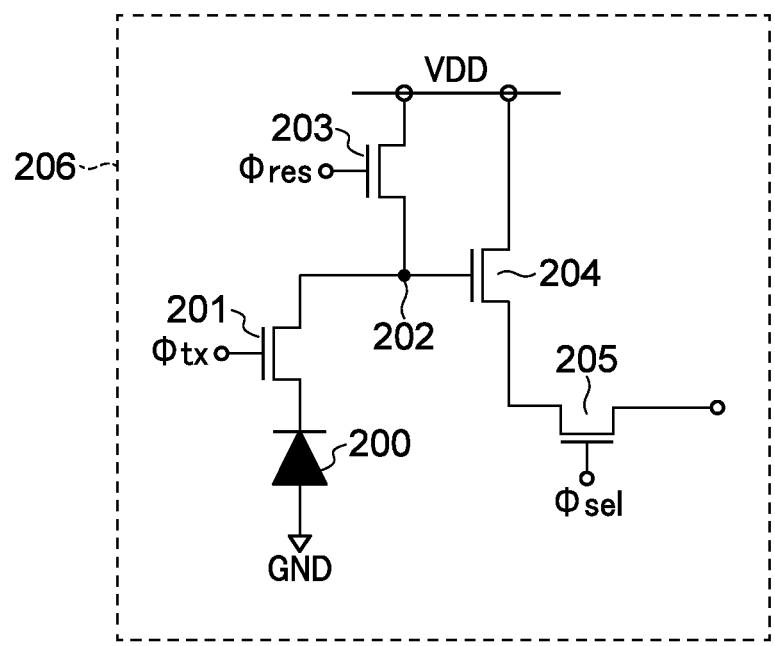
FIG. 2A is a circuit diagram of a unit pixel.
Figure 2B:
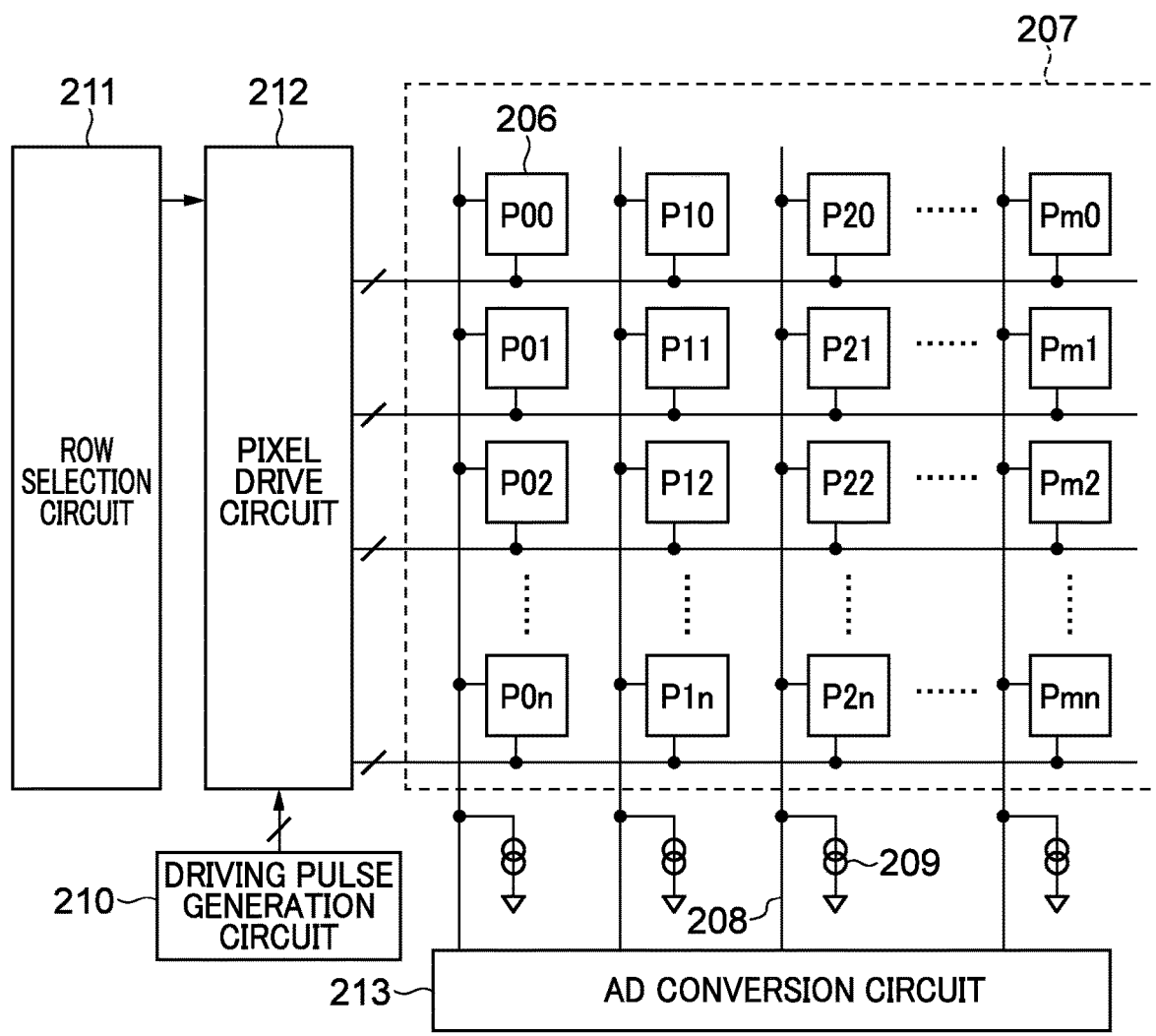
FIG. 2B is a configuration diagram of a pixel array and peripheral circuits.

FIG. 2A is a circuit diagram of a unit pixel, and FIG. 2B is a configuration diagram of a pixel array and peripheral circuits. The circuits of the image sensor 107, more particularly, the circuits around the pixels will be described with reference to FIGS. 2A and 2B. First, a circuit configuration of the unit pixel, denoted by reference numeral 206, will be described with reference to FIG. 2A. A photodiode (PD) 200 as a component of the unit pixel 206 is a device that is disposed under a micro lens, not shown, and forms a photoelectric conversion portion. A photoelectric conversion portion transfer switch 201 is controlled by a signal ϕtx. By setting the signal ϕtx to high (hereinafter referred to as "H"), photo-charge accumulated in the PD 200 can be transferred to a floating diffusion section (FD) 202.

A reset switch 203 is controlled by a signal ϕres to initialize the FD 202. A pixel reset operation is realized by changing both of the signals ϕtx and fires to "H" to set both of the PD 200 and the FD 202 to a power supply voltage (VDD). A pixel amplifying transistor 204 is connected to a select switch 205 and, when a signal ϕsel input to the select switch 205 is changed to "H", the pixel amplifying transistor 204 is further connected to a constant current source 209 (referred to hereinafter) via a vertical output line 208 (referred to hereinafter). The pixel amplifying transistor 204 connected to the constant current source 209 forms a pixel amplifier. The FD 202 is connected to this pixel amplifier. With this connection, the pixel amplifier converts photo charge transferred from the PD 200 to the FD 202 and accumulated in the FD 202 to a voltage value commensurate with an amount of charge accumulated in the FD 202 and the voltage value is output to the vertical output line 208 as a pixel signal.

Next, the circuit system of the image sensor 107 will be described with reference to a block diagram shown in FIG. 2B. The pixel array, denoted by reference numeral 207, has a plurality of unit pixels 206 arranged in a matrix. More specifically, a number (m+1) of unit pixels 206 are arranged in a horizontal direction and a number (n+1) of unit pixels 206 are arranged in a vertical direction. Note that m and n represent natural numbers. Thus, the pixel array 207 is formed by arranging a plurality of photoelectric conversion elements in a matrix. A driving pulse generation circuit 210 generates respective pulses for performing a reset operation and a readout operation of each unit pixel 206. Each pulse generated by the driving pulse generation circuit 210 is supplied to a pixel drive circuit 212. A row selection circuit 211 (readout section) selects a specific row of unit pixels 206 to which a pulse generated by the driving pulse generation circuit 210 is to be supplied and sets the selected specific row for the pixel drive circuit 212. The pixel drive circuit 212 supplies the pulse generated by the driving pulse generation circuit 210 to the specific row of unit pixels 206 selected and set by the row selection circuit 211.

By using the row selection circuit 211 by a plurality of methods, it is possible to perform readout of data from the pixel array 207 by the plurality of methods. For example, in a case where data to be used for a still image is read out, high-resolution data is required, and hence the row selection circuit 211 performs a read-out operation, by selecting each sequential row of unit pixels of the pixel array 207. On the other hand, in a case where data to be used for a moving image for LV (live view moving image) is read out, resolution is not required to be so high, and hence the row selection circuit 211 performs a read-out operation by selecting every third row of pixels of the pixel array 207.

In the latter case, a row to be read next to the zeroth row is the third row. By reading out pixels of the pixel array 207 as described above, it is possible to read out a moving image whose vertical resolution is reduced to ⅓, compared with the still image described first. When a comparison is made between the still image and the moving image, the still image is superior in resolution, whereas the moving image has a feature of readout time reduced due to reduction of the vertical resolution, and a feature of lower power required for readout operation. Thus, it is possible to acquire a plurality of types of images suitable for a variety of purposes, respectively, according to the row selection control mode of the row selection circuit 211.

The pixel signals are output to the vertical output line 208, on a selected row-by-selected row basis, in response to a pulse supplied from the pixel drive circuit 212. The constant current source 209 is combined with the pixel amplifying transistor 204 to form a source follower circuit. An analog-to-digital (AD) conversion circuit 213 (hereinafter also referred to as the "ADC 213") converts analog signals output to the vertical output line 208 to digital signals.

Figure 3A:
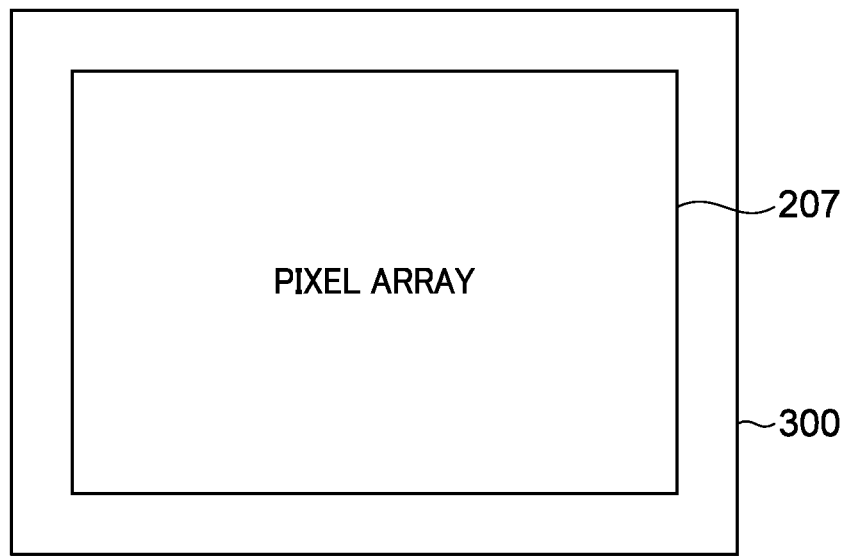
FIG. 3A is a circuit configuration diagram of a first semiconductor circuit board.
Figure 3B:
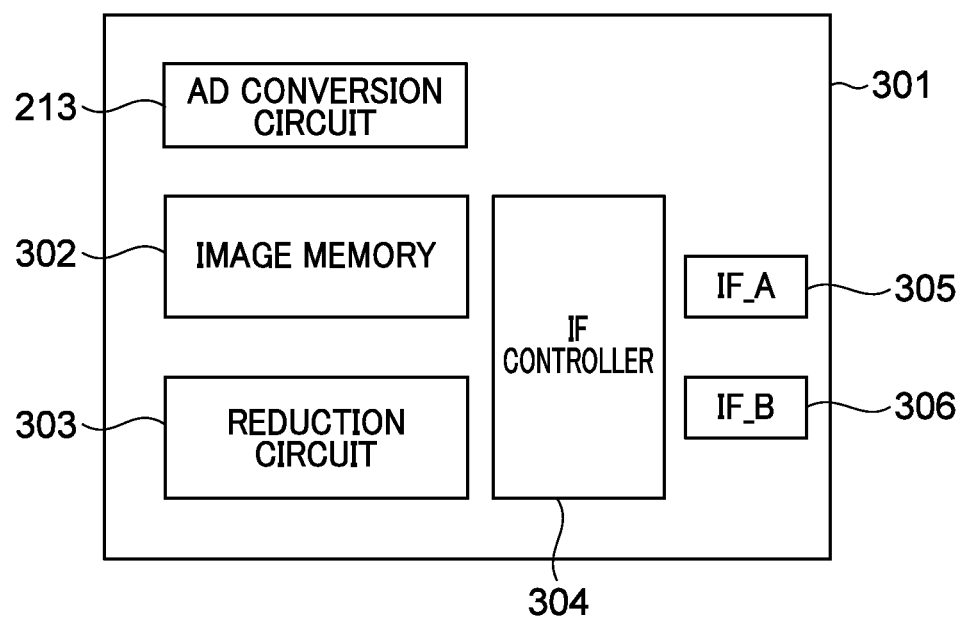
FIG. 3B is a circuit configuration diagram of a second semiconductor circuit board.
Figure 3C:
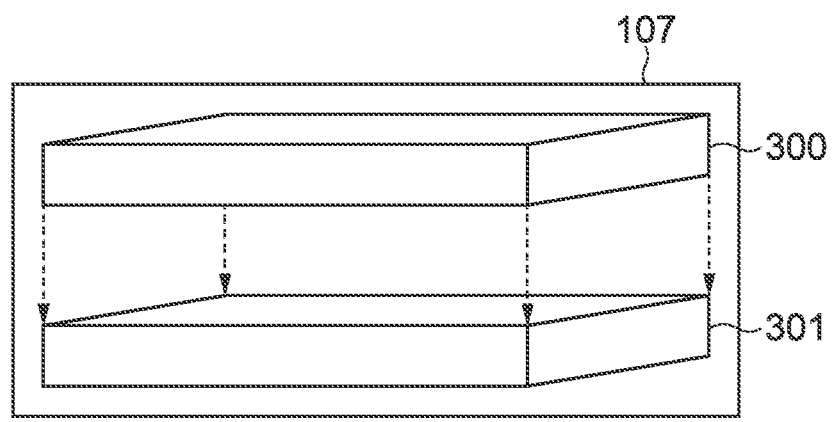
FIG. 3C is a schematic configuration diagram of an image sensor.

FIGS. 3A to 3C are diagrams showing respective circuit configurations of circuit boards and a configuration diagram of the image sensor. The image sensor 107 of the present embodiment, more particularly, a chip configuration of the image sensor 107 will be described with reference to FIGS. 3A to 3C. In general, there is a method of providing components of different circuits on each of a plurality of semiconductor circuit boards and thereafter laminating and connecting the semiconductor circuit boards to form a single chip. The image sensor 107 of the present embodiment is also formed as a single chip by laminating a first semiconductor circuit board 300 and a second semiconductor circuit board 301.

An example of the respective circuit configurations of the first semiconductor circuit board 300 and the second semiconductor circuit board 301 will be described with reference to FIGS. 3A and 3B. The pixel array 207 is provided on the first semiconductor circuit board 300. Further, the ADC 213, an image memory 302, a reduction circuit 303, an interface (IF) controller 304, an interface (IF)_A 305, and an interface (IF)_B 306 are provided on the second semiconductor circuit board 301.

The image memory 302 is a memory for temporarily storing digital image data formed by the ADC 213 performing analog-to-digital conversion of analog image signals read out from the pixel array 207. In the present embodiment, as this memory, there may be employed any memory insofar as it allows data stored therein to be nondestructively read out. Further, the reduction circuit 303 is a circuit for reducing a still image. Note that, throughout the present disclosure, "reducing an image" means "reducing the data amount of an image", and the reduction of the data amount of an image may be executed by any suitable method including compression of data and thinning of data. Therefore, a reduced still image, referred to hereinafter, is a still image obtained by conversion through reducing the data amount of an original still image, and is by no means an image which is reduced in the display size of the still image. The IF controller 304 is connected to the ADC 213, the image memory 302, the reduction circuit 303, and so forth, and performs data processing and data routing for enabling transmission of data from the IF_A 305 and the IF_B 306.

FIG. 3C is a schematic configuration diagram showing an example of the image sensor 107 formed as the single chip by laminating the first semiconductor circuit board 300 and the second semiconductor circuit board 301. FIG. 3C shows a state in which the first semiconductor circuit board 300 is laminated on the second semiconductor circuit board 301. As the technique for electrically connecting between the laminated semiconductor circuit boards, any known technique may be used.

Figure 4A:
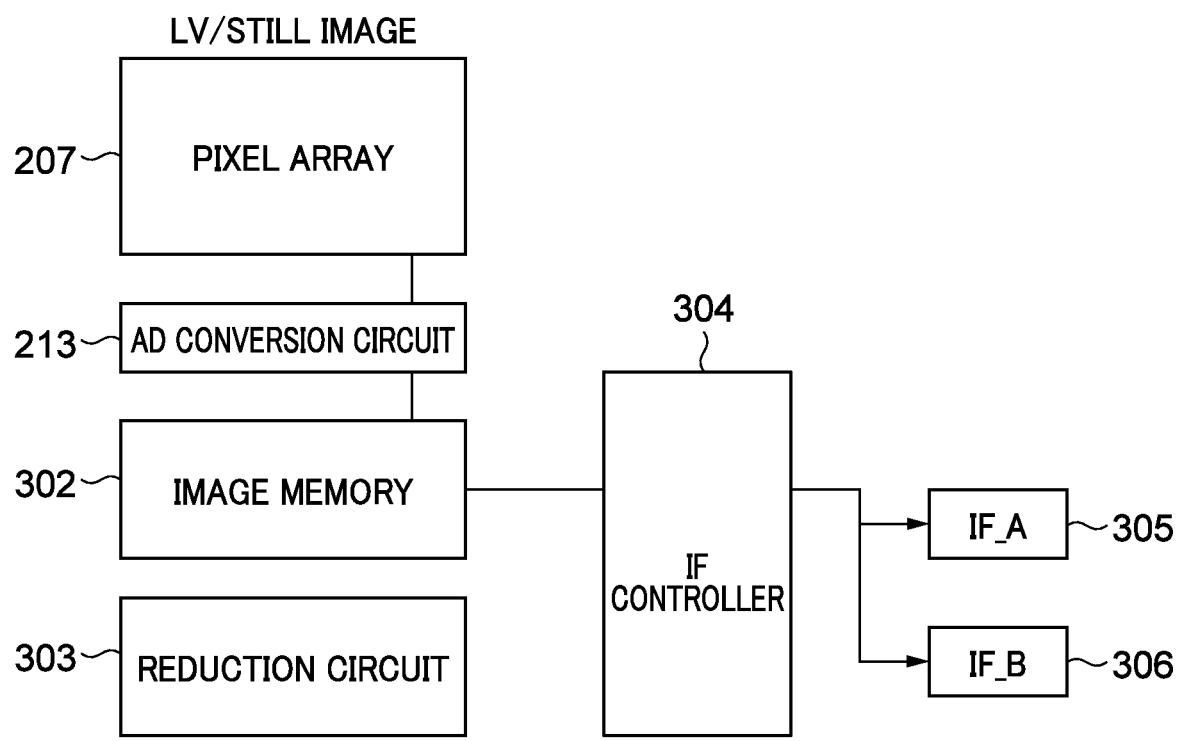
FIG. 4A is a schematic explanatory diagram of data paths for an LV moving image and a still image in the image capturing circuit according to the first embodiment.
Figure 4B:
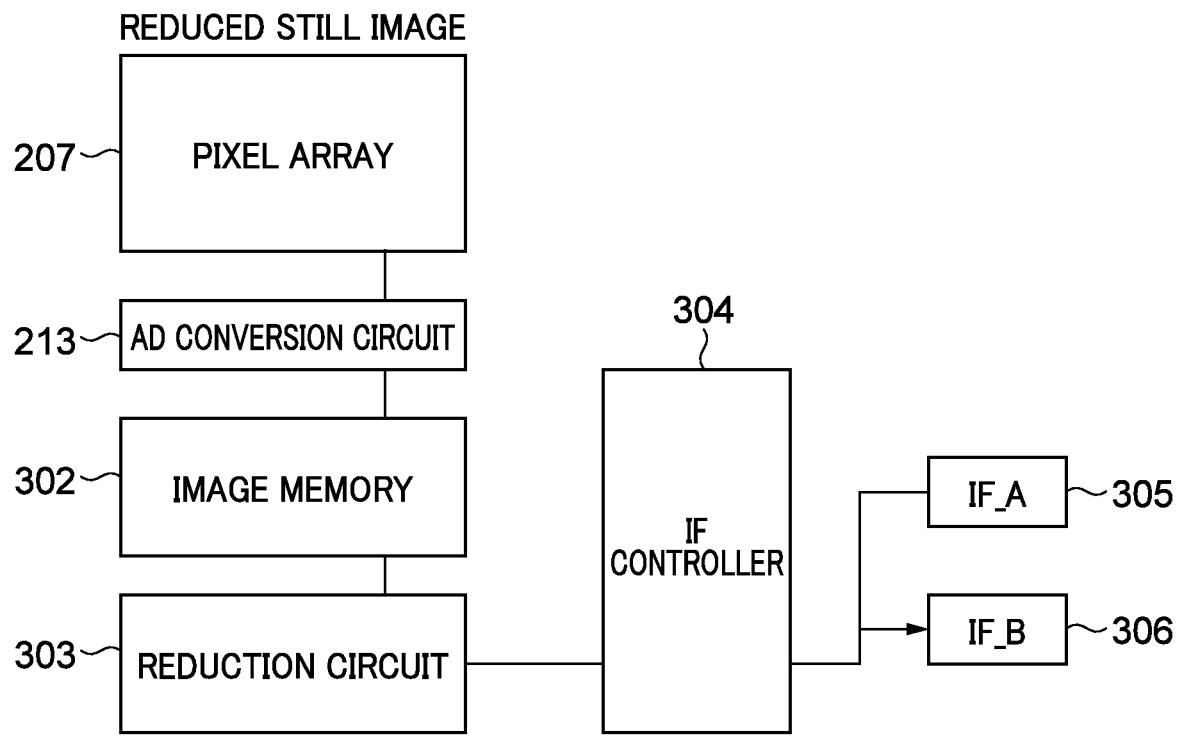
FIG. 4B is a schematic explanatory diagram of data paths for a reduced still image in the image capturing circuit according to the first embodiment.

FIGS. 4A and 4B are schematic explanatory diagrams of data paths for an LV moving image and a still image, and data paths for a reduced still image, in the image capturing circuit according to the first embodiment. A circuit block (data path) through which data of each of a still image, a reduced still image, and an LV moving image is output to the outside of the image sensor 107 will be described with reference to FIGS. 4A and 4B.

FIG. 4A shows the data paths through which a still image and an LV moving image pass. Analog image signals output from the pixel array 207 are converted to digital image data by the ADC 213 and the resulting image data is accumulated in the image memory 302. After that, the image data is read out from the image memory 302 and is output using the IF_A 305 and the IF_B 306 via the IF controller 304.

FIG. 4B shows the data paths through which a reduced still image passes. Analog image signals of the still image output from the pixel array 207 are converted to digital image data by the ADC 213 and the resulting image data is accumulated in the image memory 302. After that, the image data of the still image (hereinafter, also referred to as the still image data) is read out from the image memory 302 and is input to the reduction circuit 303 (conversion section). The reduction circuit 303 performs reduction processing on the input still image data.

As the resolution of the reduced still image, there may be mentioned a variety of values. For example, by reducing the resolution of a still image to the same resolution as that of an LV moving image using the reduction circuit 303, the processing performed by the DSP 108 at a downstream stage can be made common between the still image and the LV moving image. Further, it is also envisaged that the still image is transmitted after the reduction circuit 303 reduces only resolution of the still image in the horizontal direction to the resolution of the LV moving image. In this case, although the DSP 108 is required to perform reduction of the resolution in the vertical direction, it is possible to reduce the circuit scale of the reduction circuit 303.

The image data reduced by the reduction circuit 303 is then output using the IF_A 305 and the IF_B 306 via the IF controller 304. By designing the data path for each image as shown in FIGS. 4A and 4B, it is possible not only to commonize most of data paths for the images but also to temporarily store all image data items in the image memory 302. Therefore, there is a degree of freedom for the control timing and the like, and hence the control can be simplified.

Figure 5:
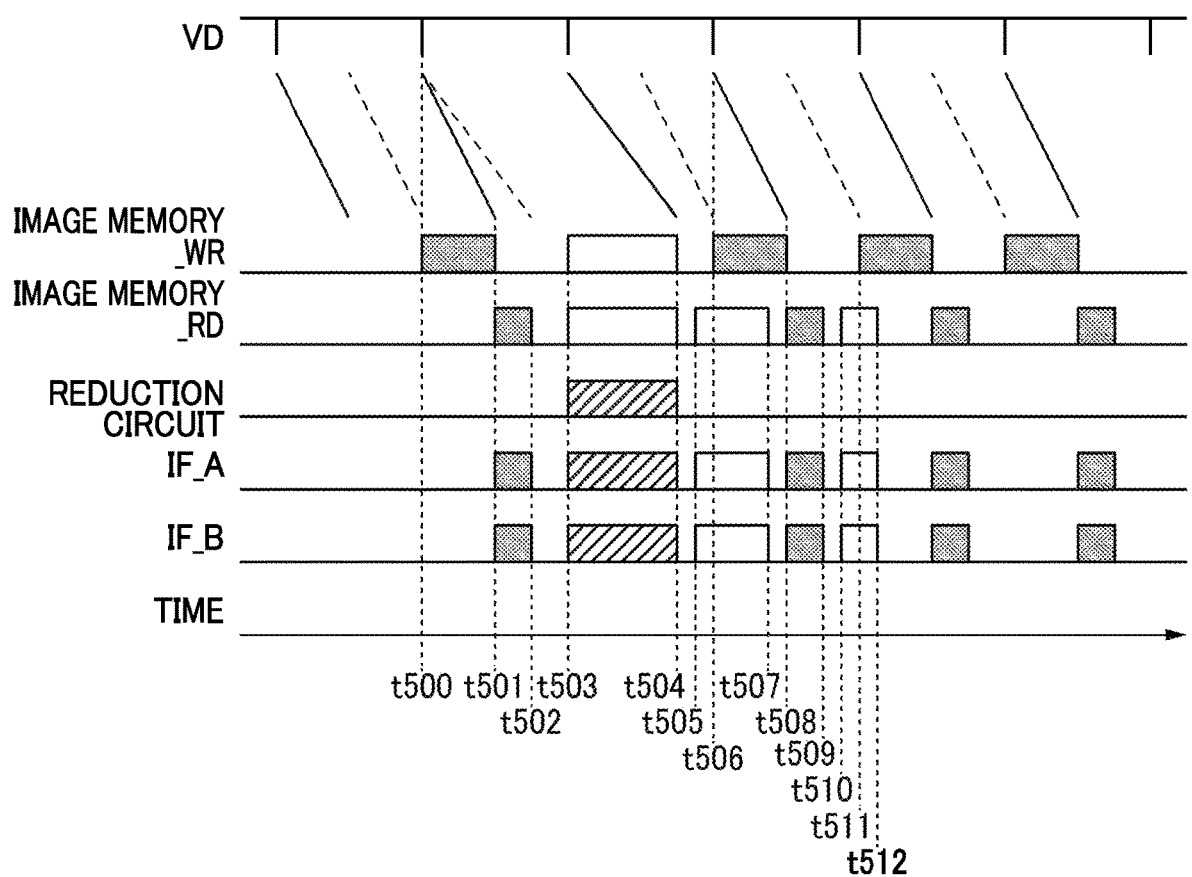
FIG. 5 is a timing diagram of an image capturing operation of the image capturing circuit according to the first embodiment.

FIG. 5 is a timing diagram of an image capturing operation of the image capturing circuit according to the first embodiment. Operations for capturing a moving image and a still image in the first embodiment will be described with reference to FIG. 5. The start of photographing a still image can be set, for example, to a timing a predetermined time period or more after a user performs the operation of pressing the still image-photographing start button included in the operation section 111. Note that out of oblique lines in FIG. 5, broken lines each represent a reset scan of each unit pixel 206 included in the pixel array 207, and solid lines each represent readout from the pixel array 207. Further, shaded boxes represent LV moving image data, white boxes represent still image data, and hatched boxes represent reduced image data.

When a vertical synchronization signal (VD) is asserted for the image sensor 107 at a time t500, the image sensor 107 reads out an LV moving image. Further, simultaneously with the start of readout, the image sensor 107 starts to write the LV moving image into the image memory 302 When readout of the LV moving image is completed at a time t501, writing of the LV moving image into the image memory is also stopped. At this timing, the LV moving image started to be written at the time t500 is started to be read out from the image memory 302. The LV moving image read out from the image memory 302 is output from the IF_A 305 and the IF_B 306 via the IF controller 304. At a time t502, readout of the LV moving image from the image memory 302 is completed.

When the vertical synchronization signal (VD) is asserted to the image sensor 107 at a time t503, the image sensor 107 reads out a still image. Further, simultaneously with the start of readout, the image sensor 107 starts to write the still image into the image memory 302. At the same time, the image sensor 107 reads out the still image from the image memory 302 and starts to input the read still image to the reduction circuit 303. For this operation, the image memory 302 in the present embodiment is configured to allow simultaneous execution of the operations for writing data therein and reading data therefrom. The still image reduced by the reduction circuit 303 is output from the IF_A 305 and the IF_B 306 via the IF controller 304. This reduced still image can be displayed on the display section 112 or the like, similar to the LV moving image. Readout of the still image is completed at a time t504, and simultaneously with this, writing of the still image into the image memory 302, readout of the still image from the image memory 302, and transfer of the reduced still image from the IF_A 305 and the IF_B 306 are completed.

Incidentally, since data can be nondestructively read out from the image memory 302, the data of the still image started to be written from the time t503 is not lost. Therefore, data of a still image which is high in vertical resolution and large in data amount is transmitted during a blanking period during which transmission of the image used for the display on the display section 112 is interrupted. The data of the still image with its original resolution is started to be read out from the image memory 302 at a time t505. The still image read out from the image memory 302 is output from the IF_A 305 and the IF_B 306 via the IF controller 304 without passing through the reduction circuit 303. This still image is not primarily aimed to be displayed on the display section 112, and hence the still image can be stored in the recording medium 113 without being displayed.

Although the next frame of the LV moving image the image sensor 107 starts to be read out and be written into the image memory 302 at a time t506, transmission of the still image is continued during reading and writing the next frame of the LV moving image. Transmission of the still image is once stopped at a time t507. At the time t507, transmission of all data of the still image has not been completed. At a time t508, readout of the LV moving image and writing of the same into the image memory 302, started at the time t506, are completed. At the same time, transmission of the LV moving image from the IF_A 305 and the IF_B 306 via the IF controller 304 is started. At a time t509, transmission of the LV moving image started at the time t508 is completed.

At a time t510, the image sensor 107 starts to read out the remaining portion of the still image started to be read out at the time t505. At a time t511, the image sensor 107 starts to read out the LV moving image (the next frame) and write the same into the image memory 302. Then, at a time t512, readout of the still image, started at the time t505, and transmission of the still image from the IF_A 305 and the IF_B 306 are completed.

As described above, according to the first embodiment, a still image with a first resolution and an LV moving image with a second resolution lower than the first resolution are read out from the pixel array 207 by the row selection circuit 211 (readout section). The still image with the first resolution corresponds to first image data, and the LV moving image with the second resolution corresponds to second image data. The image memory 302 can store the LV moving image and still image which are read out. Further, the reduction circuit 303 performs reduction conversion of the read still image to a reduced still image (third image data) with a third resolution lower than the first resolution. Then, the image capturing circuit according to the present embodiment performs an operation of reading out the still image (first image data) from the image memory 302 and outputting the read still image after reduction conversion and an operation of outputting the read still image without performing reduction conversion thereof, while performing an operation of reading out the moving image from the image memory 302 and outputting the moving image without performing reduction conversion thereof.

Further, in the present embodiment, the image capturing circuit is equipped with the IF_A 305 and the IF_B 306 and has a first transmission mode for transmitting the still image using both of the IF_A 305 and the IF_B 306 during a blanking period of the LV moving image or the reduced still image. Note that the IF_A 305 and the IF_B 306 correspond to a first interface and a second interface, respectively. Further, the third resolution can be made equal to the second resolution or made lower than the first resolution and higher than the second resolution.

As described above, in the present embodiment, the LV moving image is also once stored in the memory and is then output to the outside of the image sensor. By once storing all of images in the memory, it is possible to obtain an effect that it is possible to ease the restriction on the control timing.

Next, a variation of the first embodiment will be described. Although in the example shown in the first embodiment, the image sensor 107 is formed by laminating the first substrate 300 and the second substrate 301, the present invention is not limited to this, but a variety of circuit configurations may be employed.

Figure 6A:
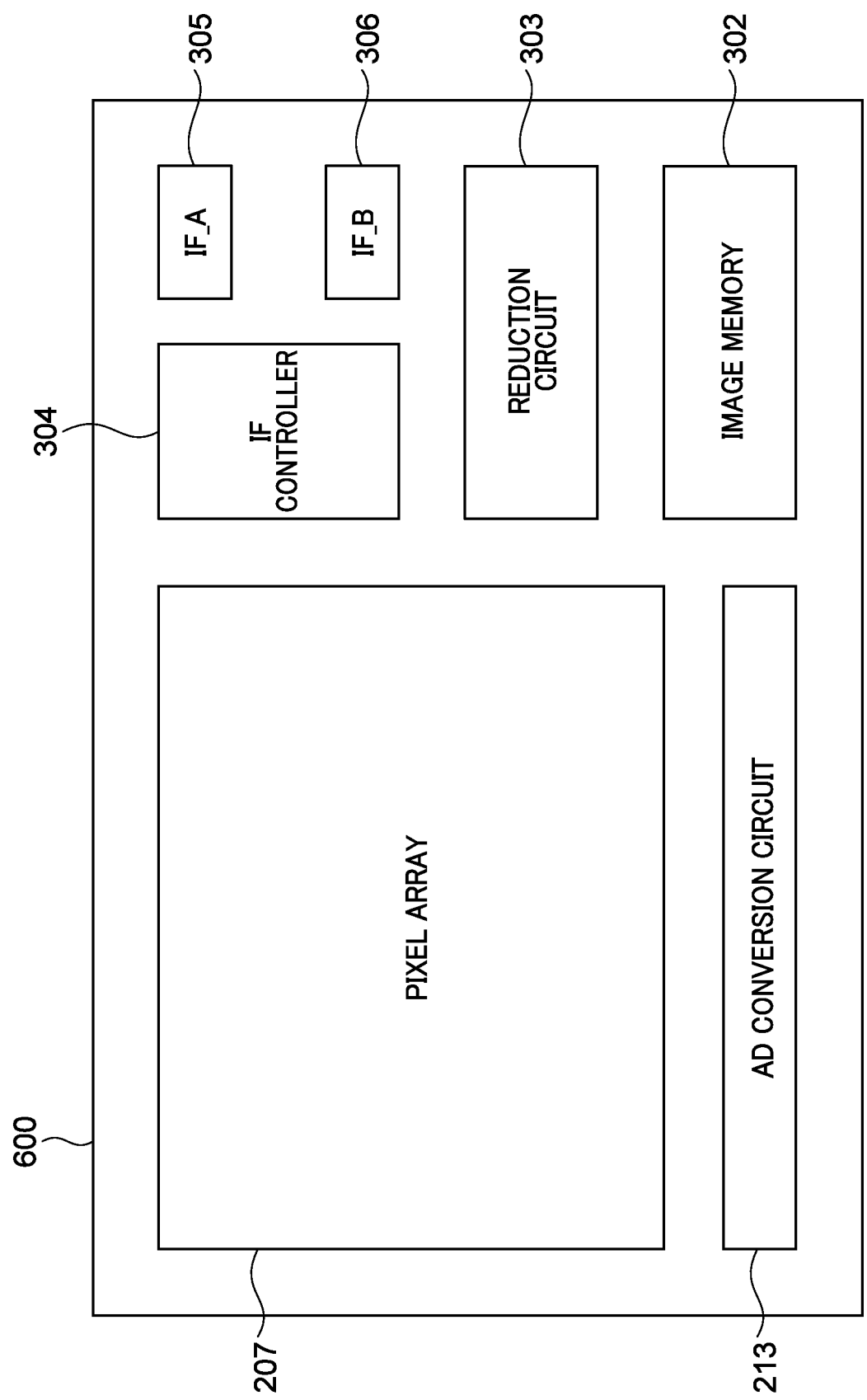
FIG. 6A is a circuit configuration diagram of a variation of the semiconductor circuit board.
Figure 6B:
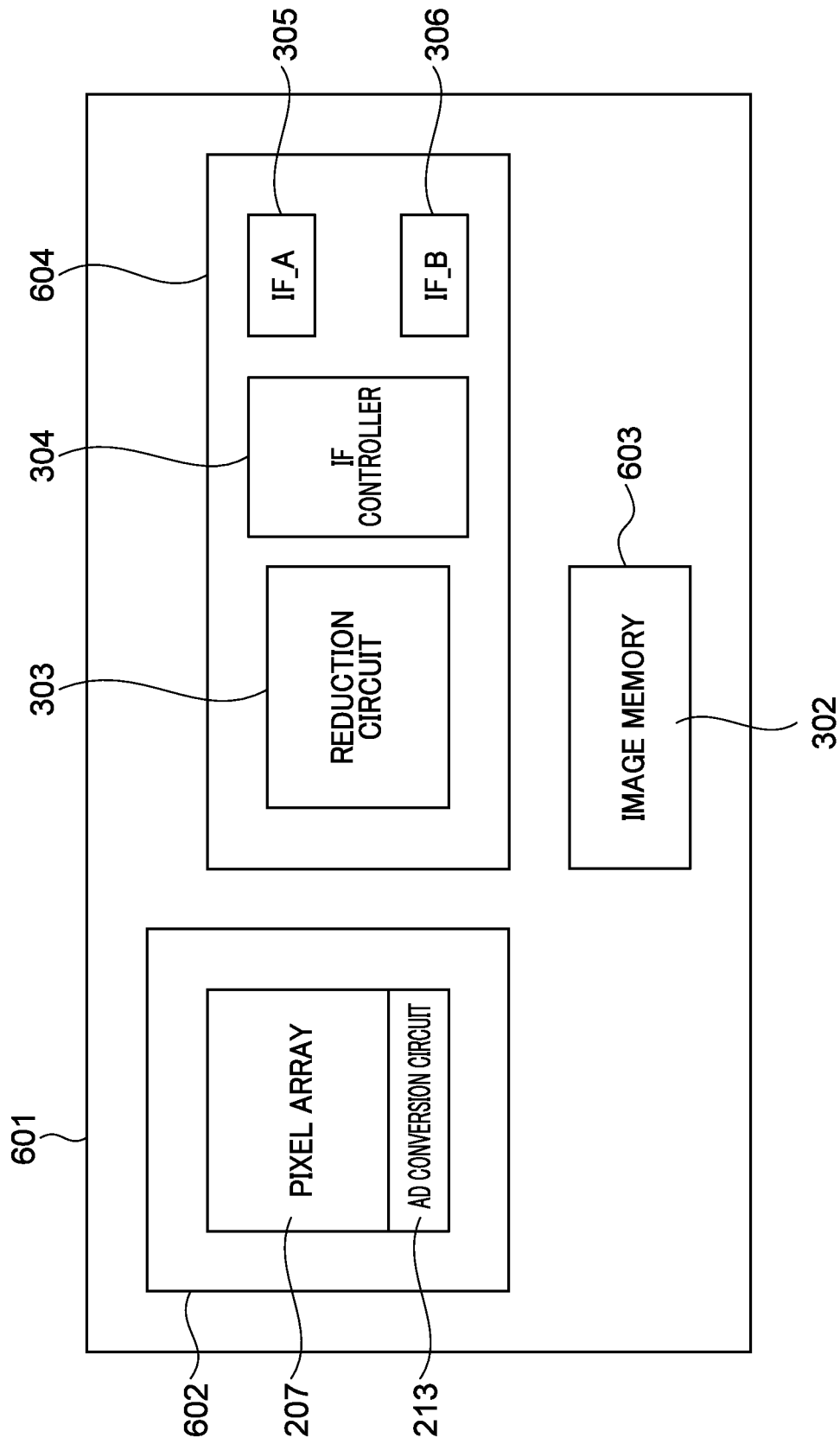
FIG. 6B a circuit configuration diagram of another variation of the semiconductor circuit board.

FIGS. 6A and 6B are variations of the semiconductor circuit board. FIG. 6A shows an example of the semiconductor circuit board formed by arranging the pixel array 207, the ADC 213, the image memory 302, the reduction circuit 303, the IF controller 304, the IF_A 305, and the IF_B 306 on a single semiconductor circuit board 600. For example, in a case where the pixel array 207 is small, it is possible to simplify the whole configuration of the image capturing apparatus by manufacturing the image capturing circuit using a single semiconductor circuit board. FIG. 6B is a schematic explanatory diagram of an example in which the component circuits are manufactured by dividing them into a plurality of chips and mounting the chips on a single semiconductor circuit board 601. The pixel array 207 and the ADC 213 are provided on a first chip 602, the image memory 302 is provided on a second chip 603, and the reduction circuit 303, the IF controller 304, the IF_A 305, and the IF_B 306 are provided on a third chip 604. This arrangement is formed only by the chips which do not require the technique of laminating semiconductor circuit boards, and hence it is possible to facilitating the manufacturing of chips. Further, any other suitable circuit configuration, not shown, can be employed.

Figure 7B:
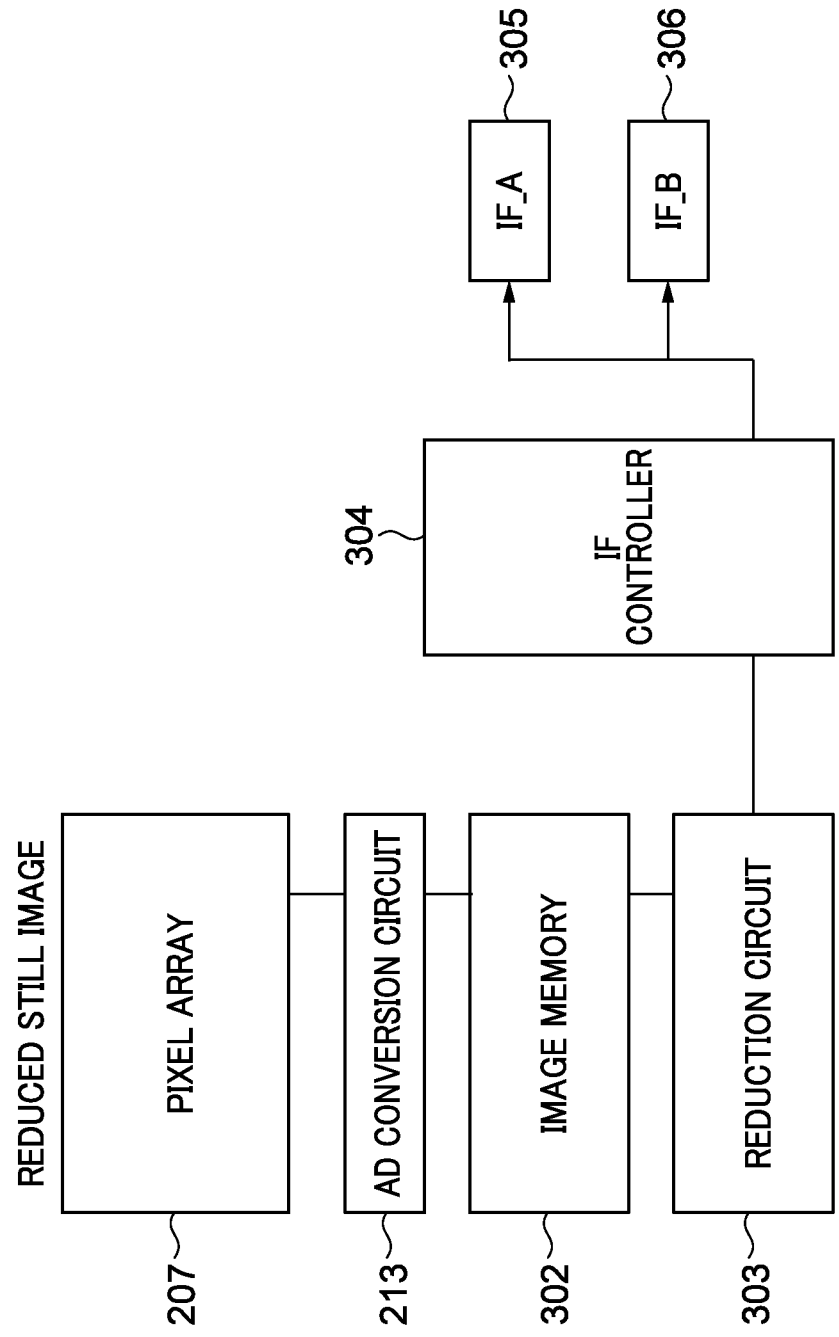
FIG. 7B is a schematic explanatory diagram of data paths for a reduced still image in the image capturing circuit according to the second embodiment.
Figure 7C:
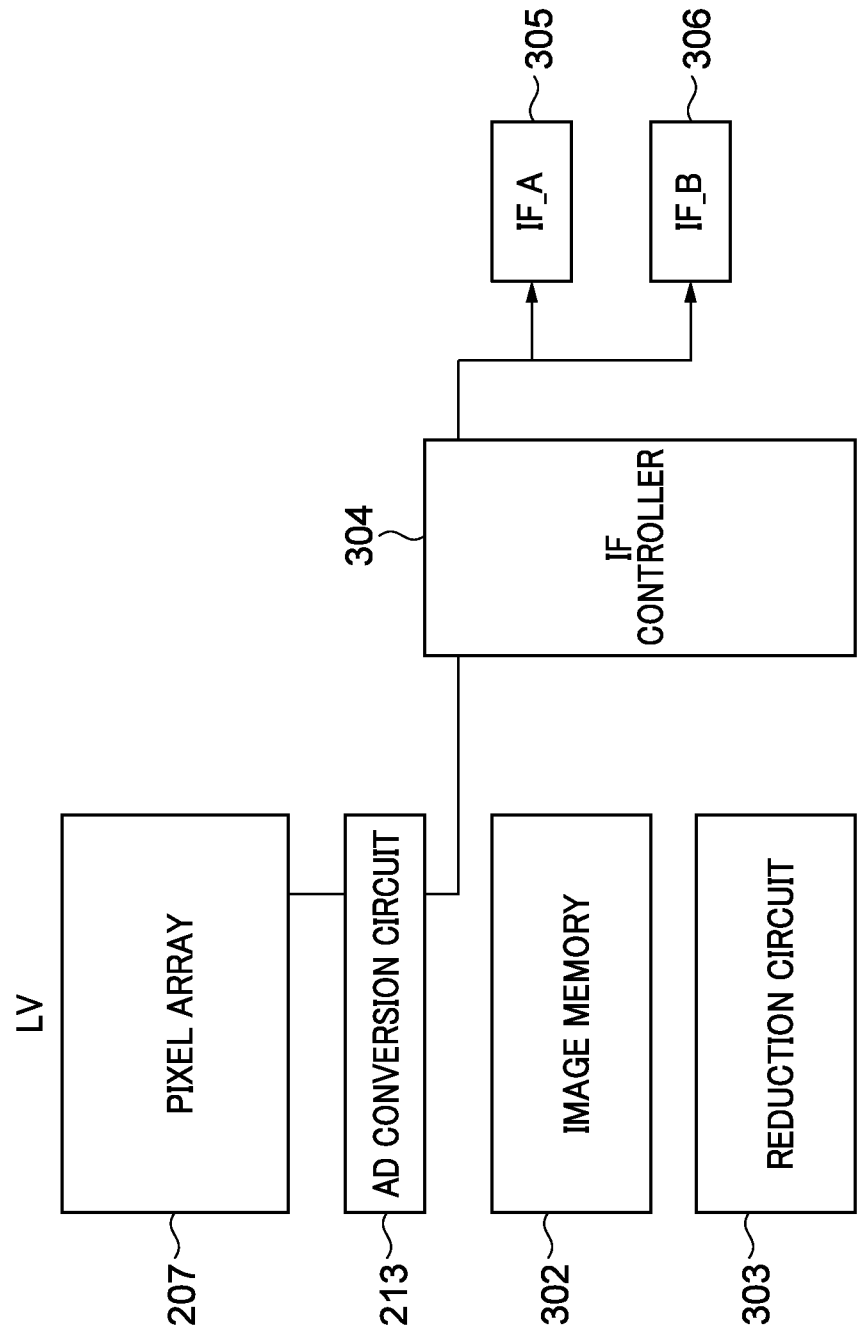
FIG. 7C is a schematic explanatory diagram of data paths for an LV moving image in the image capturing circuit according to the second embodiment.

Next, a second embodiment of the present invention will be described. FIGS. 7A to 7C are schematic explanatory diagrams of data paths for a still image, a reduced still image, and an LV moving image, respectively, in an image capturing circuit according to the second embodiment. With reference to FIGS. 7A to 7C, the data paths in the second embodiment through which the still image, the LV moving image, and the reduced still image are output to the outside of the image sensor 107 will be described.

FIG. 7A is a schematic explanatory diagram of data paths through which a still image passes, illustrating the same path configuration as that shown in FIG. 4A. FIG. 7B is a schematic explanatory diagram of data paths through which a reduced still image passes, illustrating the same path configuration as that shown in FIG. 4B. FIG. 7C is a schematic explanatory diagram of data paths through which an LV moving image passes. Analog image signals of the LV moving image output from the pixel array 207 are converted to digital image data by the ADC 213, and the resulting image data is output using the IF_A 305 and the IF_B 306 via the IF controller 304. At this time, the LV moving image is never stored in the image memory 302, and hence it is possible to reduce the display delay before displaying the LV moving image by employing this circuit configuration.

Figure 8:
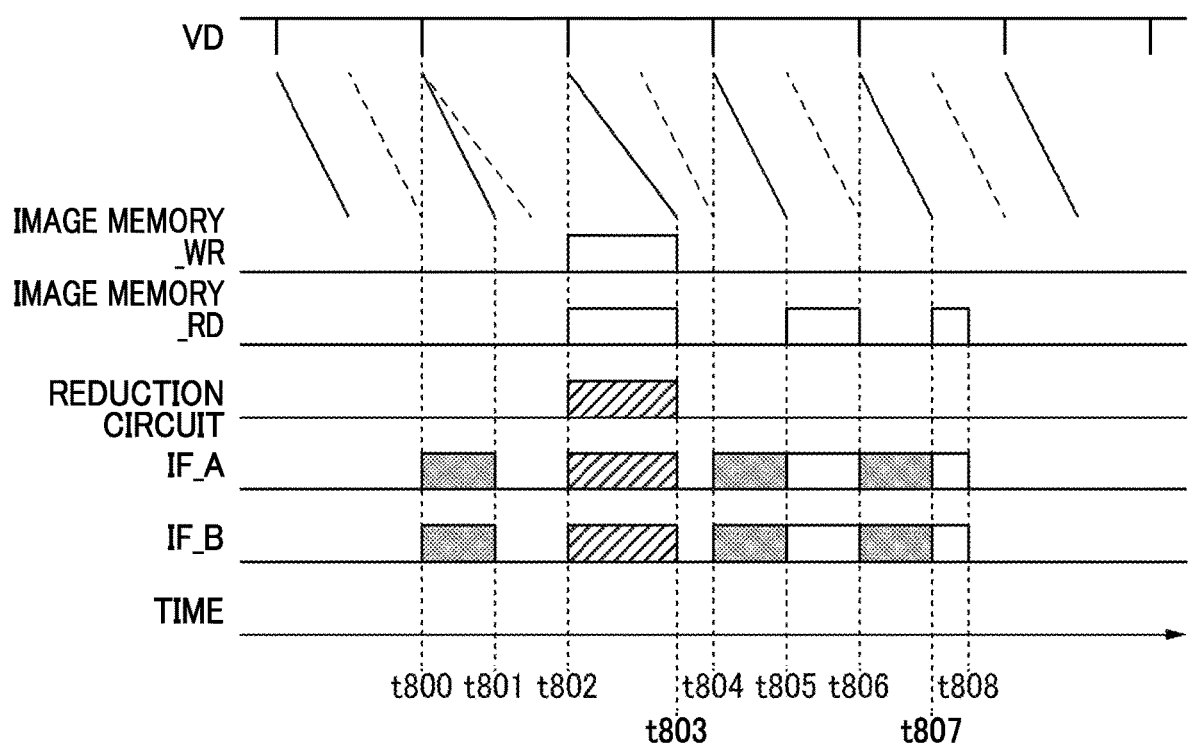
FIG. 8 is a timing diagram of an image capturing operation of the image capturing circuit according to the second embodiment.

FIG. 8 is a timing diagram of an image capturing operation of the image capturing circuit according to the second embodiment. The start of photographing a still image can be set, for example, to a timing a predetermined time period or more after a user performs the operation of pressing the still image-photographing start button included in the operation section 111. Note that out of oblique lines in FIG. 8, broken lines each represent a reset scan of each unit pixel 206 included in the pixel array 207, and solid lines each represent readout from the pixel array 207. Further, shaded boxes represent LV moving image data, white boxes represent still image data, and hatched boxes represent reduced image data.

When the vertical synchronization signal (VD) is asserted to the image sensor 107 at a time t800, the image sensor 107 reads out an LV moving image. Further, simultaneously with the start of readout, the image sensor 107 outputs the LV moving image using the IF_A 305 and the IF_B 306 via the IF controller 304. At a time t801, readout of the LV moving image is completed, and data transfer from the IF_A 305 and the IF_B 306 is completed at the same time.

When the vertical synchronization signal (VD) is asserted to the image sensor 107 at a time t802, the image sensor 107 reads out a still image. Further, simultaneously with the start of readout, the image sensor 107 starts to write the still image into the image memory 302. At the same time, the image sensor 107 reads out the still image from the image memory 302 and starts to input the read still image to the reduction circuit 303. For this operation, the image memory 302 in the present embodiment is configured to allow simultaneous execution of the operations for writing data therein and reading data therefrom. The still image reduced by the reduction circuit 303 is output from the IF_A 305 and the IF_B 306 via the IF controller 304. This reduced still image can be displayed on the display section 112 or the like, similar to the LV moving image. Readout of the still image is completed at a time t803. At the same time, writing of the still image into the image memory 302 and readout of the same from the image memory 302, and transfer of the reduced still image from the IF_A 305 and the IF_B 306 are completed.

When the vertical synchronization signal (VD) is asserted to the image sensor 107 at a time t804, the image sensor 107 reads out the LV moving image (the next frame). Further, simultaneously with the start of readout, the image sensor 107 outputs the LV moving image using the IF_A 305 and the IF_B 306 via the IF controller 304. At a time t805, readout of the LV moving image is completed, and data transfer from the IF_A 305 and the IF_B 306 is completed at the same time. Further, simultaneously with completion of transfer of the LV moving image at the time t805, transfer of the still image stored in the image memory 302 is started.

At a time t806, transfer of the still image is interrupted, and the vertical synchronization signal (VD) is asserted to the image sensor 107 at the same time. Therefore, the image sensor 107 reads out the LV moving image. Further, simultaneously with the start of readout, the image sensor 107 outputs the LV moving image using the IF_A 305 and the IF_B 306 via the IF controller 304. At a time t807, readout of the LV moving image is completed, and data transfer from the IF_A 305 and the IF_B 306 is completed at the same time. In short, transfer of the LV moving image is completed at the time t807. At the same time, transfer of the still image stored in the image memory 302, interrupted at the time t806, is resumed. Transfer of this still image is completed at a time t808.

As described above, according to the second embodiment, a still image with the first resolution and an LV moving image with the second resolution lower than the first resolution are read out from the pixel array 207 by the row selection circuit 211 (readout section). The image memory 302 can store the read still image. Further, the reduction circuit 303 performs reduction conversion of the read still image to a reduced still image (third image data) with the third resolution lower than the first resolution. The image capturing circuit according to the present embodiment performs an operation of reading out the still image (first image data) from the image memory 302 and outputting the read still image after reduction conversion and an operation of outputting the read still image without performing reduction conversion thereof, while performing an operation of outputting the moving image without storing the same in the image memory 302.

Thus, by performing the operations of the image capturing circuit according to the second embodiment, as described above, it is possible to transmit a still image from the image sensor 107 without interrupting a live view image while reducing the display delay of the LV moving image.

Figure 9A:
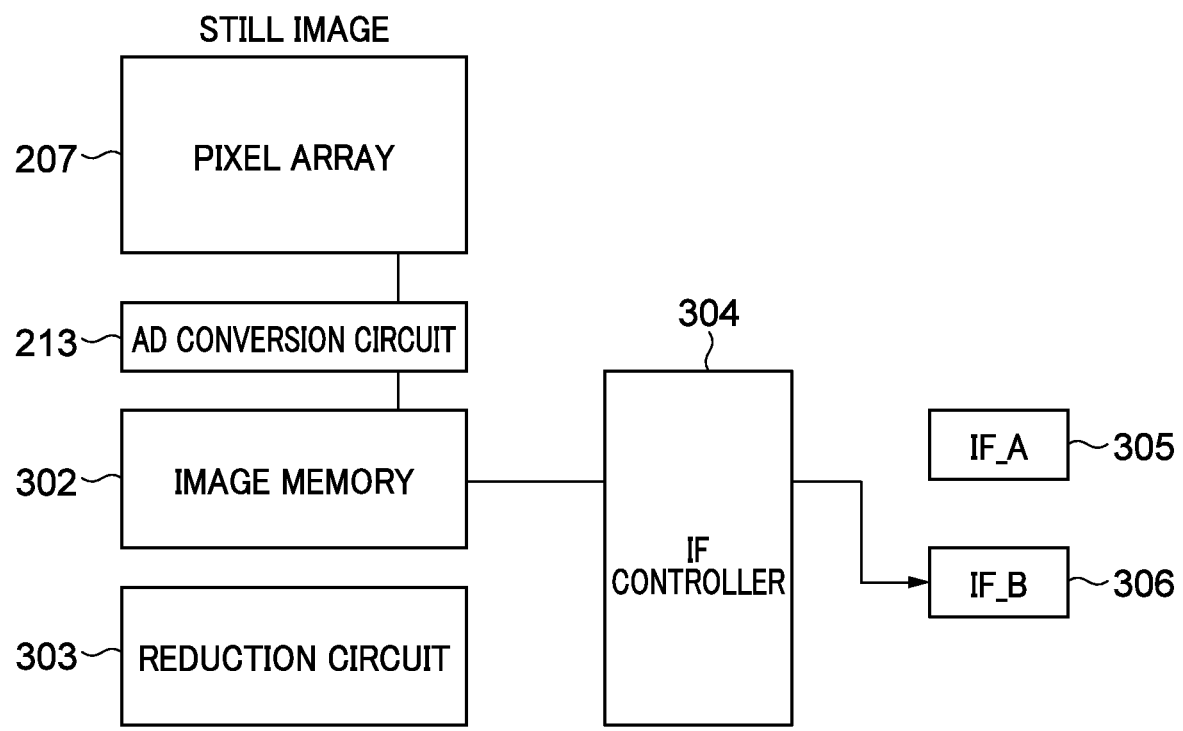
FIG. 9A is a schematic explanatory diagram of a data path for a still image in an image capturing circuit according to a third embodiment.
Figure 9B:
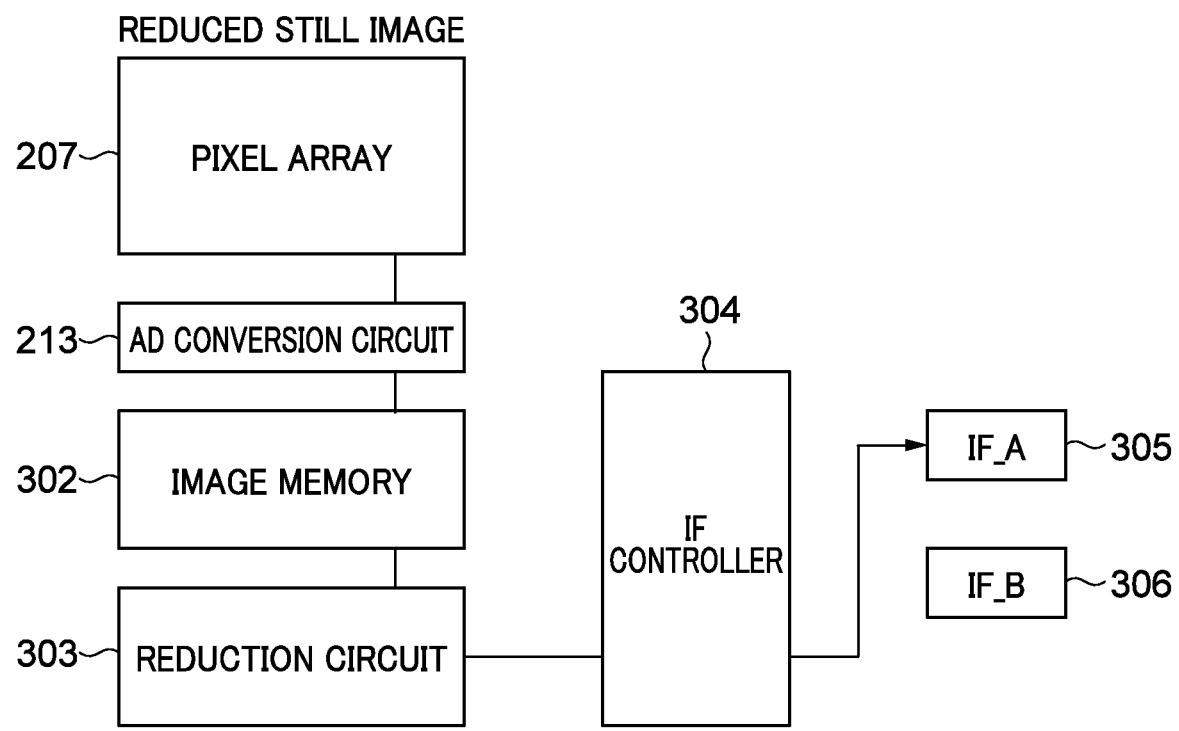
FIG. 9B is a schematic explanatory diagram of a data path for a reduced still image in the image capturing circuit according to the third embodiment.
Figure 9C:
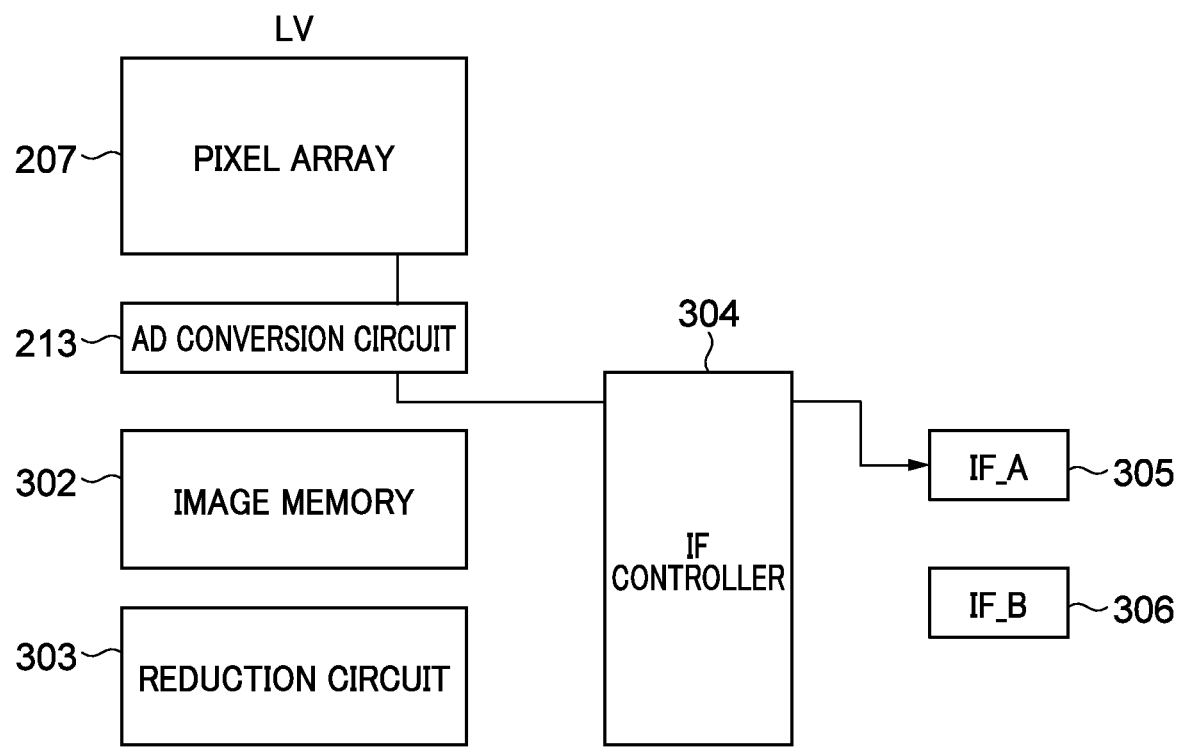
FIG. 9C is a schematic explanatory diagram of a data path for an LV moving image in the image capturing circuit according to the third embodiment.

Next, the third embodiment of the present invention will be described. FIGS. 9A to 9C are schematic explanatory diagrams of data paths for a still image, a reduced still image, and an LV moving image, respectively, in the image capturing circuit according to a third embodiment. With reference to FIGS. 9A to 9C, the data paths in the third embodiment through which the still image, the LV moving image, and the reduced still image are output to the outside of the image sensor 107 will be described.

FIG. 9A is a schematic explanatory diagram of a data path through which a still image passes. Analog image signals of the still image output from the pixel array 207 are converted to digital image data by the ADC 213 and the resulting still image data is stored in the image memory 302. After that, the still image data (hereinafter simply referred to as the still image, as deemed appropriate) is read out from the image memory 302 and output using the IF_B 306 via the IF controller 304. FIG. 9B is a schematic explanatory diagram of a data path through which a reduced still image passes. Analog image signals of the still image output from the pixel array 207 are converted to digital image data by the ADC 213 and the resulting still image data is stored in the image memory 302. After that, the still image is read out from the image memory 302 and input to the reduction circuit 303. The reduction circuit 303 performs reduction processing on the still image. As described in the first embodiment, the reduced still image may have any resolution. The reduced still image is output using the IF_A 305 via the IF controller 304.

FIG. 9C is a schematic explanatory diagram of a data path through which an LV moving image passes. Analog image signals of the LV moving image output from the pixel array 207 are converted to digital image data by the ADC 213 and the resulting LV moving image data is output using the IF_A 305 via the IF controller 304. By designing the data path for each image as shown in FIGS. 9A to 9C, it is possible to make the interface (IF) used for transferring an image to be displayed on the display section 112 (IF_A 305) and the interface (IF) used for transferring a still image (IF_B 306) independent from each other. With the configuration described above, it is possible to simplify the control.

Figure 10:
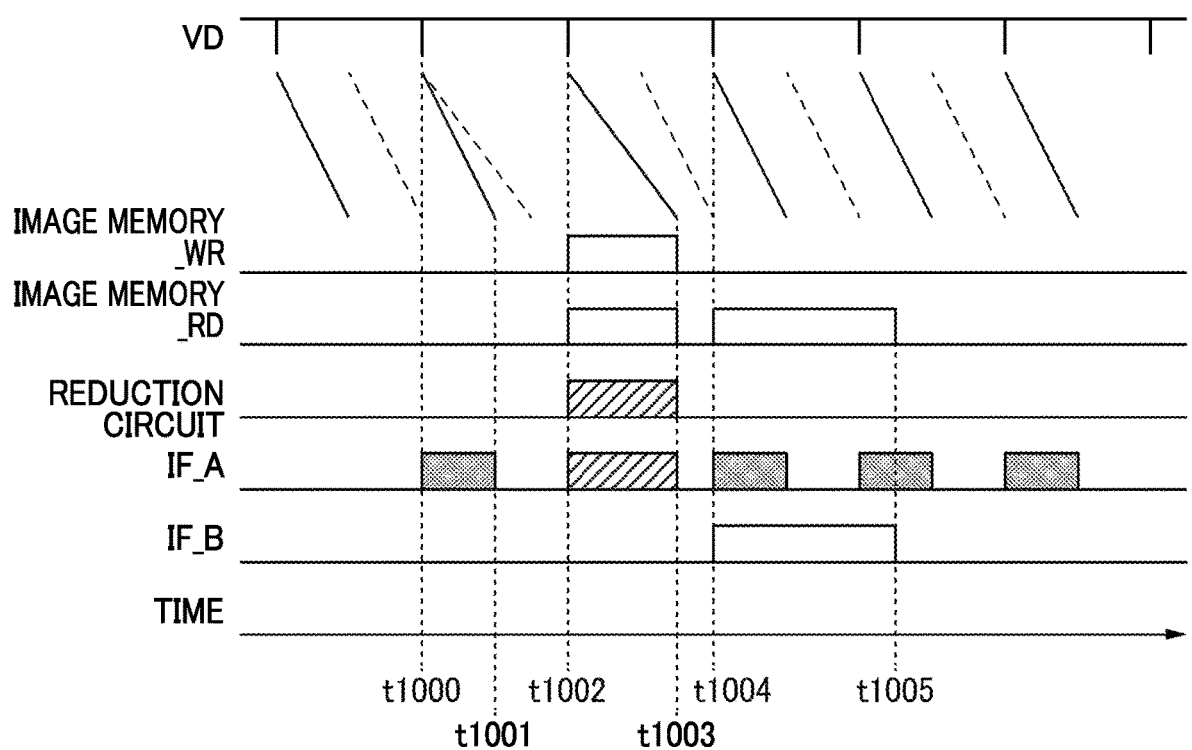
FIG. 10 is a timing diagram of an image capturing operation of the image capturing circuit according to the third embodiment.

FIG. 10 is a timing diagram of an image capturing operation of the image capturing circuit according to the third embodiment. The image capturing operation for a moving image and a still image in the third embodiment will be described with reference to FIG. 10. The start of photographing a still image can be set, for example, to a timing a predetermined time period or more after a user performs the operation of pressing the still image-photographing start button included in the operation section 111. Note that out of oblique lines in FIG. 10, broken lines each represent a reset scan of each unit pixel 206 included in the pixel array 207, and solid lines each represent readout from the pixel array 207 Further, shaded boxes represent LV moving image data, white boxes represent still image data, and hatched boxes represent reduced image data.

When the vertical synchronization signal (VD) is asserted to the image sensor 107 at a time t1000, the image sensor 107 reads out an LV moving image. Further, simultaneously with the start of readout, the image sensor 107 outputs the LV moving image using the IF_A 305 via the IF controller 304. At a time t1001, readout of the LV moving image is completed, and data transfer from the IF_A 305 is completed at the same time. At this time, the LV moving image has not been stored in the image memory 302. Therefore, the data readout rate of the LV moving image is required to be low enough to completely transfer data thereof using only the IF_A 305, i.e. equal to or lower than the data transfer rate of the IF_A 305.

When the vertical synchronization signal (VD) is asserted to the image sensor 107 at a time t1002, the image sensor 107 reads out a still image. Further, simultaneously with the start of readout of the still image, the image sensor 107 starts to write the still image into the image memory 302. At the same time, the image sensor 107 reads out the still image from the image memory 302 and starts to input the read still image to the reduction circuit 303. For this operation, the image memory 302 in the present embodiment is configured to allow simultaneous execution of the operations for writing data therein and reading data therefrom. The still image reduced by the reduction circuit 303 is output from the IF_A 305 via the IF controller 304. This reduced still image can be displayed on the display section 112 or the like, similar to the LV moving image. Readout of the still image is completed at a time t1003. At the same time, writing of the still image into the image memory 302 and transfer of the reduced still image from the IF_A 305 are completed.

When the vertical synchronization signal (VD) is asserted to the image sensor 107 at a time t1004, the image sensor 107 reads out the next frame of the LV moving image. Further, simultaneously with the start of readout, the image sensor 107 outputs the LV moving image using the IF_A 305 via the IF controller 304. Further, the image sensor 107 starts to transfer the still image stored in the image memory 302 using the IF_B 306 at the same time. Thus, by using the different IFs, it is possible to perform transfer of the still image and transfer of the LV moving image independently of each other. Although transfer of the still image is completed at a time t1005, transfer of the LV moving image may be performed a plurality of times while the still image is transferred (transfer of two frames o the LV moving image is performed using the IF_A 305 in the present embodiment).

According to the present embodiment, it is possible to transfer the still image and the LV moving image with the simple control. However, as mentioned above, this configuration can be used only in the case where the data readout rate of the LV moving image is equal to or lower than the data transfer rate of the IF_A 305. Therefore, for example, in a case where the present invention is applied to simultaneous execution of recording of a high-resolution moving image and recording of a still image, the data readout rate of the moving image can exceed the data transfer rate of the IF_A 305. In this case, if data transfer is performed by applying the method disclosed in the second embodiment, although the control becomes complicated, it is possible to transfer the moving image and the still image without interrupting recording of the moving image. To do this, it is desirable that it is possible to switch between the method disclosed in the second embodiment and the method disclosed in the third embodiment by selecting a mode of the image capturing apparatus.

In the present embodiment, the image capturing circuit is equipped with the IF_A 305 and the IF_B 306, and transmits a still image (first image data) using the IF_B 306. The image capturing circuit according to the third embodiment has a second transmission mode for transmitting a still image using the IF_B 306 and transmitting an LV moving image and a reduced still image using the IF_A 305. Note that the IF_B 306 and the IF_A 305 correspond to the first interface and the second interface, respectively. Further, the image capturing circuit can be configured to have a first camera mode and a second camera mode, and to use the above-described first transmission mode in the first camera mode and the second transmission mode in the second camera mode.

Thus, by causing the image capturing apparatus 1 to perform the operations as described in the third embodiment, it is possible to transmit a still image from the image sensor 107 without interrupting a live view image by the simple configuration.

Figure 11A:
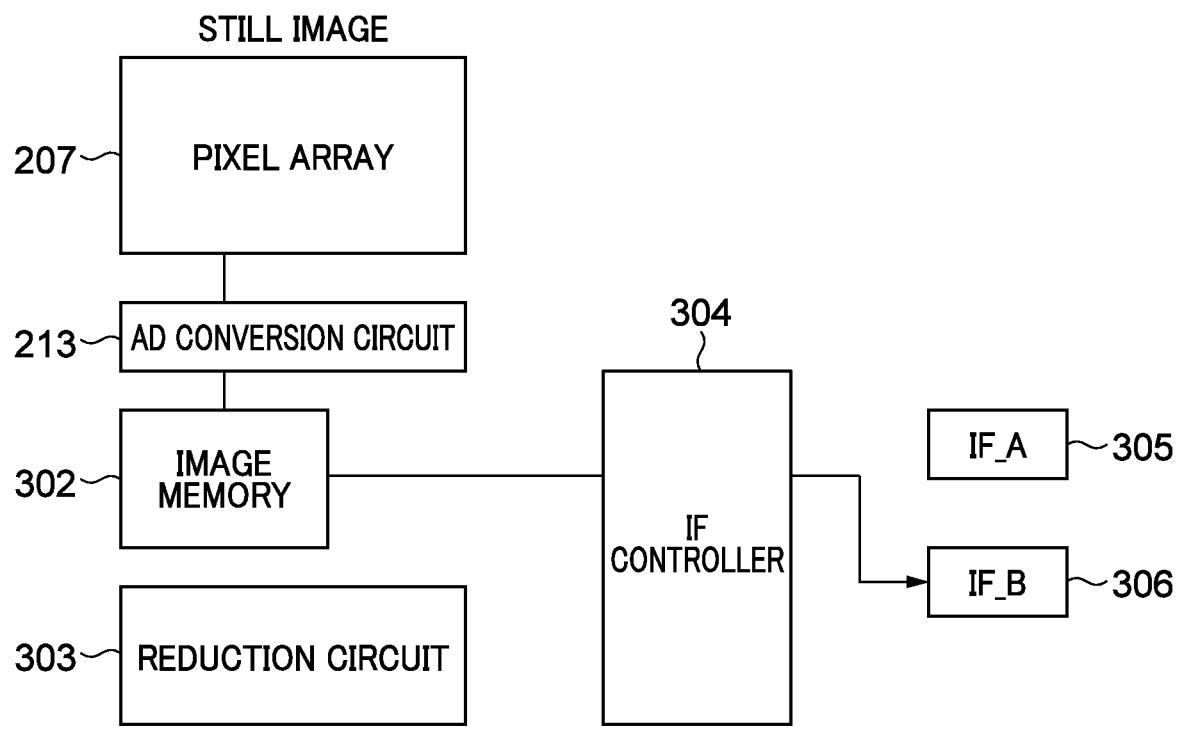
FIG. 11A is a schematic explanatory diagram of a data path for a still image in an image capturing circuit according to a fourth embodiment.
Figure 11B:
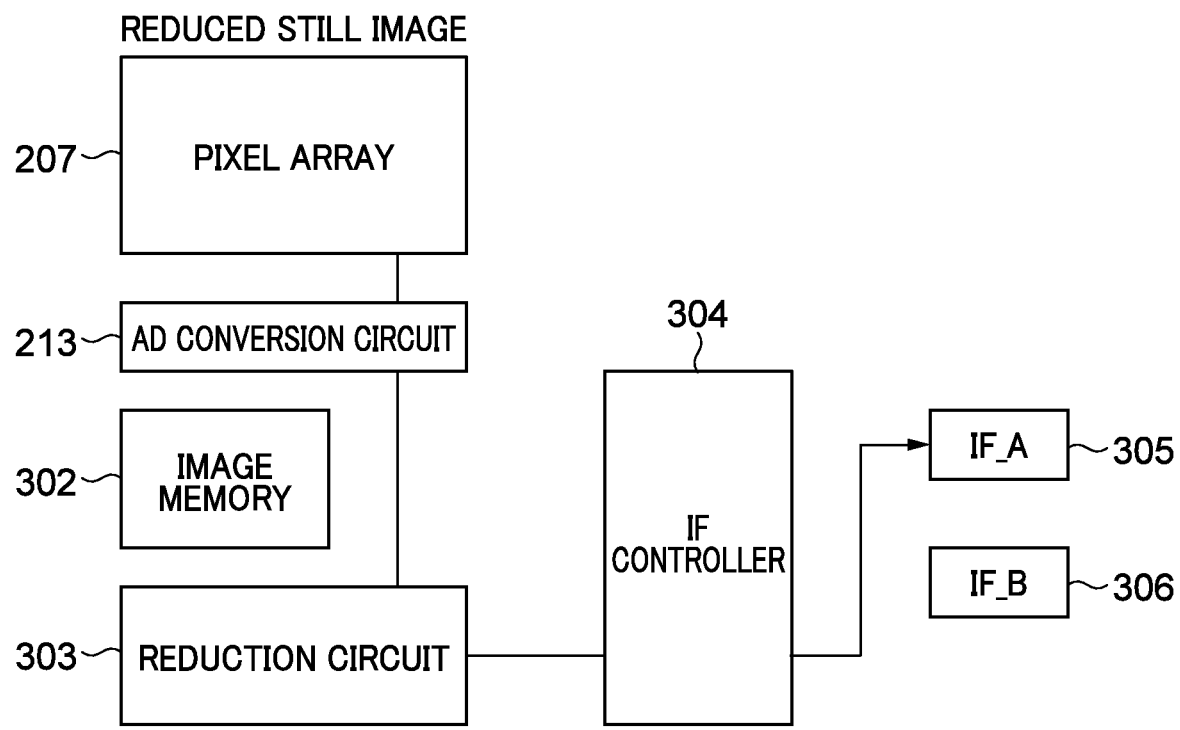
FIG. 11B is a schematic explanatory diagram of a data path for a reduced still image in the image capturing circuit according to the fourth embodiment.
Figure 11C:
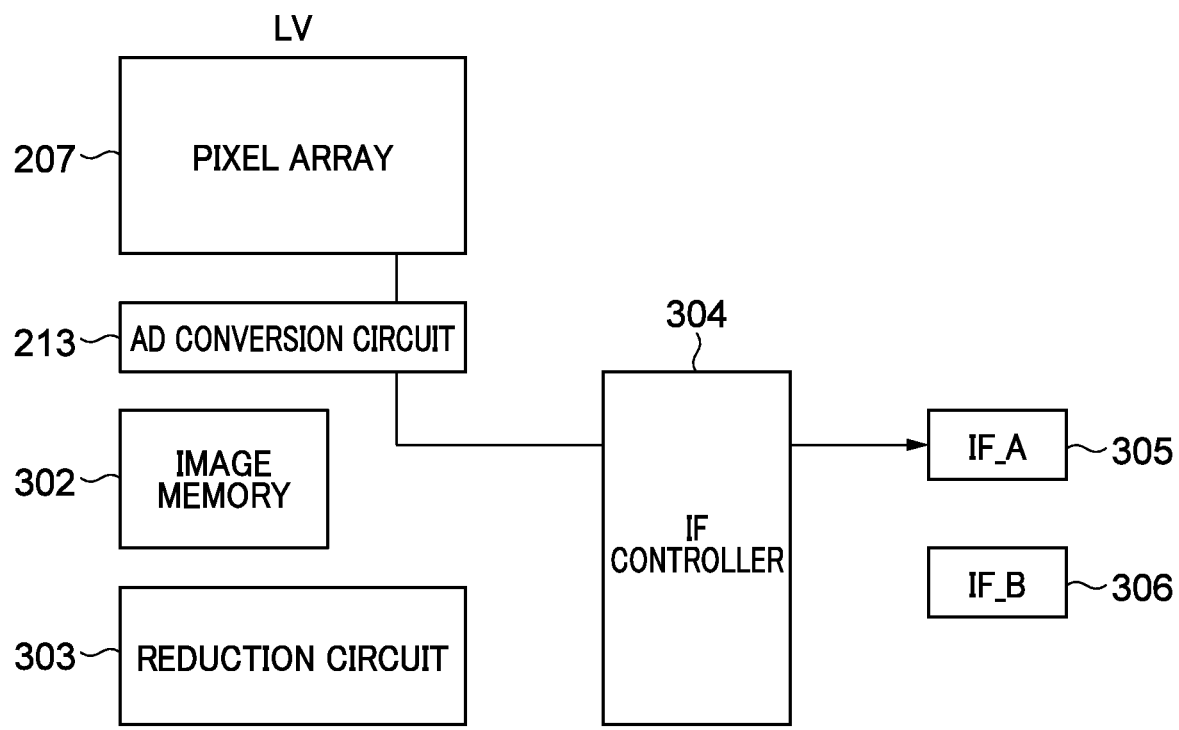
FIG. 11C is a schematic explanatory diagram of a data path for an LV moving image in the image capturing circuit according to the fourth embodiment.

Next, a fourth embodiment of the present invention will be described. FIGS. 11A to 11C are schematic explanatory diagrams of data paths for a still image, a reduced still image, and an LV moving image, respectively. The data path through which data of each of a still image, an LV moving image, and a reduced still image is output to the outside of the image sensor 107 will be described with reference to FIGS. 11A to 11C. FIG. 11A is a schematic explanatory diagram of a data path through which a still image passes. Analog image signals of the still image output from the pixel array 207 are converted to digital image data by the ADC 213 and the resulting still image data is accumulated in the image memory 302. After that, the still image is read out from the image memory 302 and output using the IF_B 306 via the IF controller 304.

FIG. 11B is a schematic explanatory diagram of a data path through which a reduced still image passes. Analog image signals of the still image output from the pixel array 207 are converted to digital image data by the ADC 213 and the resulting still image data is input to the reduction circuit 303. The reduction circuit 303 performs reduction processing on the input still image data. As described in the first embodiment, the reduced still image may have any resolution. The image reduced by the reduction circuit 303 is output using the IF_A 305 via the IF controller 304.

FIG. 11C is a schematic explanatory diagram of a data path through which an LV moving image passes. Analog image signals of the LV moving image output from the pixel array 207 are converted to digital image data by the ADC 213 and the resulting LV moving image data is output using the IF_A 305 via the IF controller 304. That is, the data path diagram shown in FIG. 11C is the same as the data path diagram shown in FIG. 9C.

By designing the data path for each image as shown in FIGS. 11A to 11C, it is possible to generate the reduced still image without using the image memory 302. In a case where this configuration is employed, the data is input to the reduction circuit 303 without changing the readout rate of the still image. Therefore, the circuit scale of the reduction circuit 303 is increased. However, in the present embodiment, the image memory 302 is used only for the still image. As a result, the requirements regarding the memory size, the access speed, and so forth of the image memory 302 are eased. For example, in the present embodiment, as described hereinafter, the image memory 302 is not required to execute the reading and writing operations at the same time.

Figure 12:
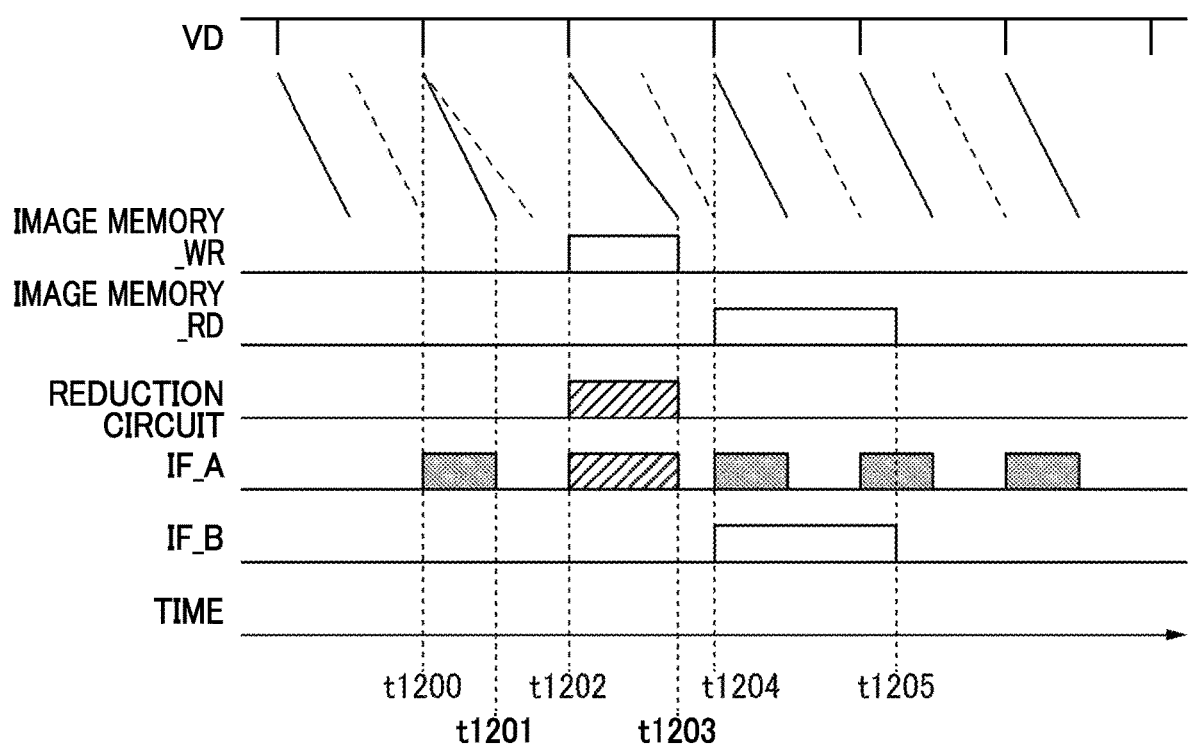
FIG. 12 is a timing diagram of an image capturing operation of the image capturing circuit according to the fourth embodiment.

FIG. 12 is a timing diagram of an image capturing operation of the image capturing circuit according to the fourth embodiment. The image capturing operation for a moving image and a still image in the present embodiment will be described with reference to FIG. 12. The start of photographing a still image can be set, for example, to a timing a predetermined time period or more after a user performs the operation of pressing the still image-photographing start button included in the operation section 111. Note that out of oblique lines in FIG. 12, broken lines each represent a reset scan of each unit pixel 206 included in the pixel array 207, and solid lines each represent readout from the pixel array 207. Further, shaded boxes represent LV moving image data, white boxes represent still image data, and hatched boxes represent reduced image data.

When the vertical synchronization signal (VD) is asserted to the image sensor 107 at a time t1200, the image sensor 107 reads out an LV moving image. Further, simultaneously with the start of readout of the LV moving image, the image sensor 107 outputs the LV moving image using the IF_A 305 via the IF controller 304. At a time t1201, readout of the LV moving image is completed, and data transfer from the IF_A 305 is completed at the same time. At this time, the LV moving image has not been stored in the image memory 302. Therefore, the data readout rate of the LV moving image is required to be low enough to completely transfer data thereof using only the IF_A 305, i.e. equal to or lower than the data transfer rate of the IF_A 305.

When the vertical synchronization signal (VD) is asserted to the image sensor 107 at a time t1202, the image sensor 107 reads out a still image. Further, simultaneously with the start of readout of the still image, the image sensor 107 starts to store the still image into the image memory 302 and input the still image to the reduction circuit 303. At this time, the data input to the reduction circuit 303 is not the data once stored in the image memory 302. Therefore, a data processing rate at which the reduction circuit 303 can process data is required to be equal to or higher than the data readout rate of the still image. Further, the image memory 302 in the present embodiment is not necessarily required to be capable of simultaneous execution of the reading and writing operations. The still image reduced by the reduction circuit 303 is output from the IF_A 305 via the IF controller 304. This reduced still image can be displayed on the display section 112 or the like, similar to the LV moving image. Then, at a time t1203, readout of the still image is completed. Data transfer of the reduced still image from the IF_A 305 is completed at the same time.

When the vertical synchronization signal (VD) is asserted to the image sensor 107 at a time t1204, the image sensor 107 reads out an LV moving image. Further, simultaneously with the start of readout of the LV moving image, the image sensor 107 outputs the LV moving image using the IF_A 305 via the IF controller 304. Further, the image sensor 107 starts to transfer the still image stored in the image memory 302 using the IF_B 306 at the same time. Thus, by using the different interfaces (Ifs), it is possible to perform transfer of the still image and transfer of the LV moving image independently of each other. Although transfer of the still image is completed at a time t1205, transfer of a plurality of frames of the LV moving image may be performed during the transfer of the still image. In the present embodiment, transfer of two frames of the LV moving image is performed.

According to the present embodiment, the row selection circuit 211 (readout section) reads out a still image (first image data) with the first resolution and a moving image (second image data) with the second resolution lower than the first resolution from the pixel array 207. The read still image is stored in the image memory 302. The reduction circuit 303 converts the read still image to a reduced still image (third image data) with the third resolution lower than the first resolution. The still image is input to the reduction circuit 303 and simultaneously written into the image memory 302, the stored still image is read out from the image memory 302 and output, and the reduced still image and the moving image are output without being written into the image memory 302.

Thus, by causing the image capturing apparatus 1 to perform the operations as described in the fourth embodiment, it is possible to transmit a still image from the image sensor 107 without interrupting a live view image while reducing the display delay of a reduced still image. Further, it is also possible to simplify the circuit configuration of the image memory 302.

Figure 13:
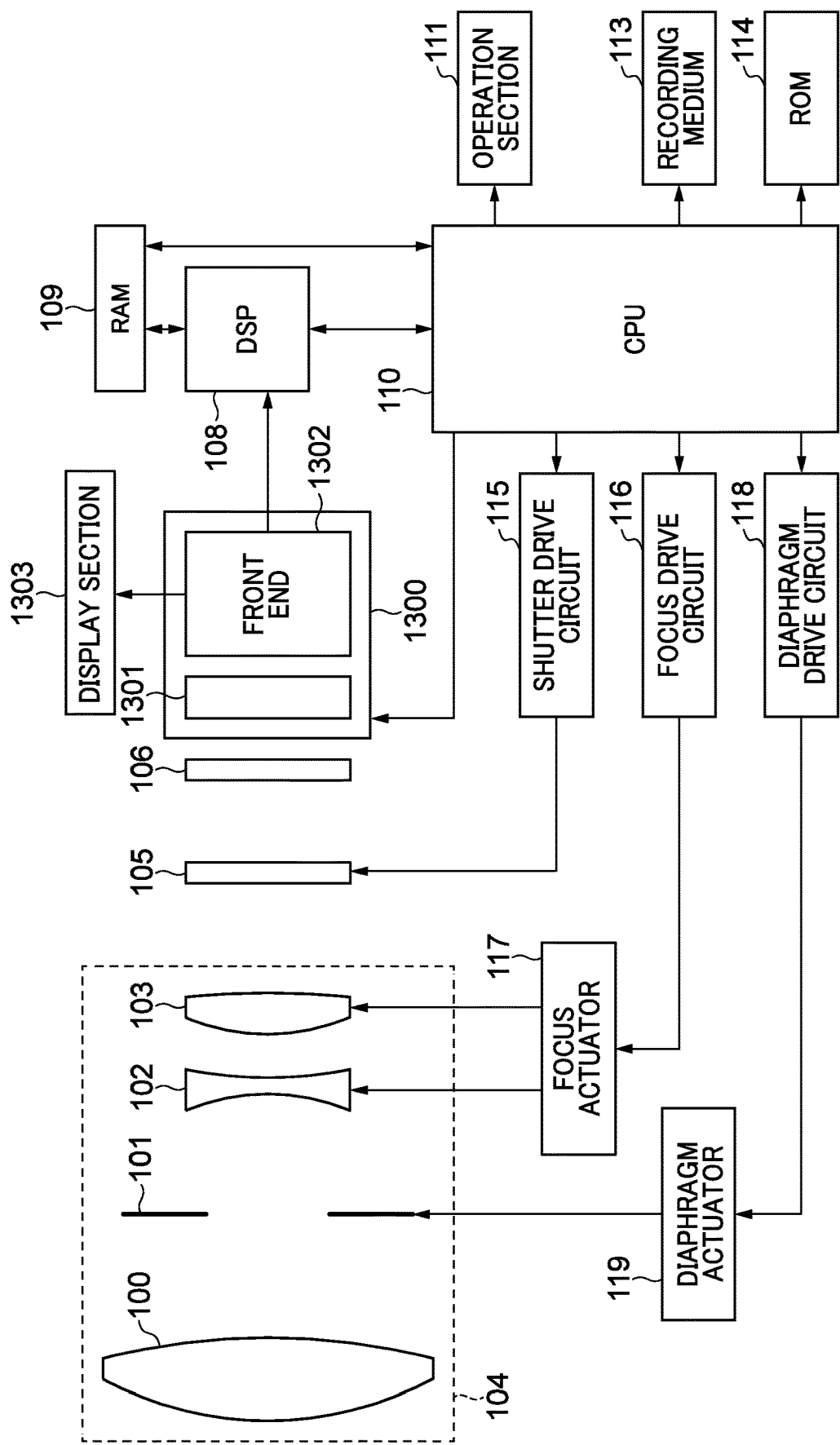
FIG. 13 is a block diagram of an image capturing apparatus equipped with an image capturing circuit according to a fifth embodiment.

Next, a fifth embodiment of the present invention will be described. FIG. 13 is a block diagram of an image capturing apparatus according to the fifth embodiment of the present invention. FIG. 13 differs from FIG. 1 in that an image capturing circuit board 1300 is replaces the image sensor 107. The image capturing circuit board 1300 has an image capturing chip 1301 and a front end 1302 mounted thereon. To the front end 1302, a display section 1303 and the DSP 108 are connected.

Figure 14A:
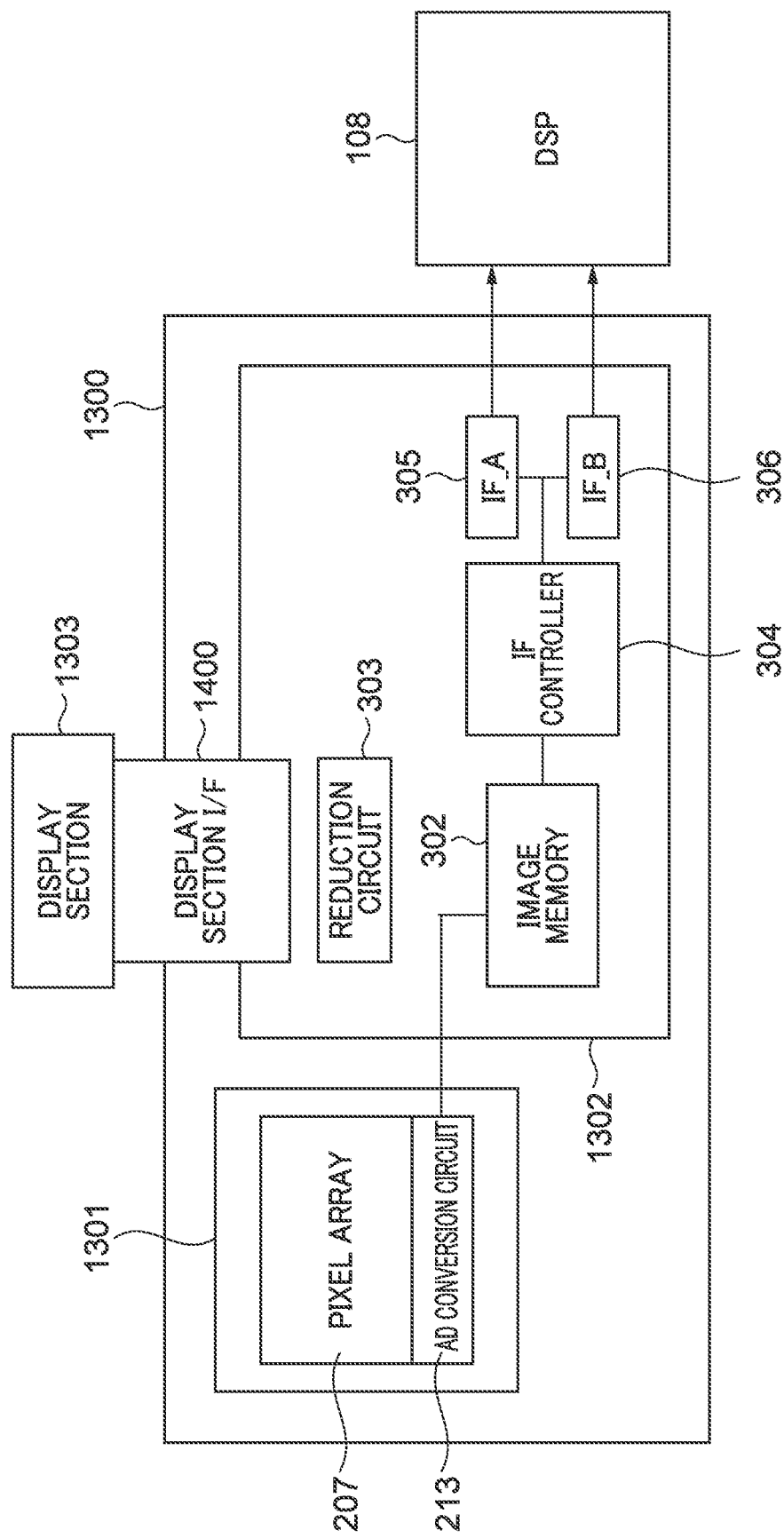
FIG. 14A is a schematic explanatory diagram of data paths for a still image in the image capturing circuit according to the fifth embodiment.
Figure 14B:
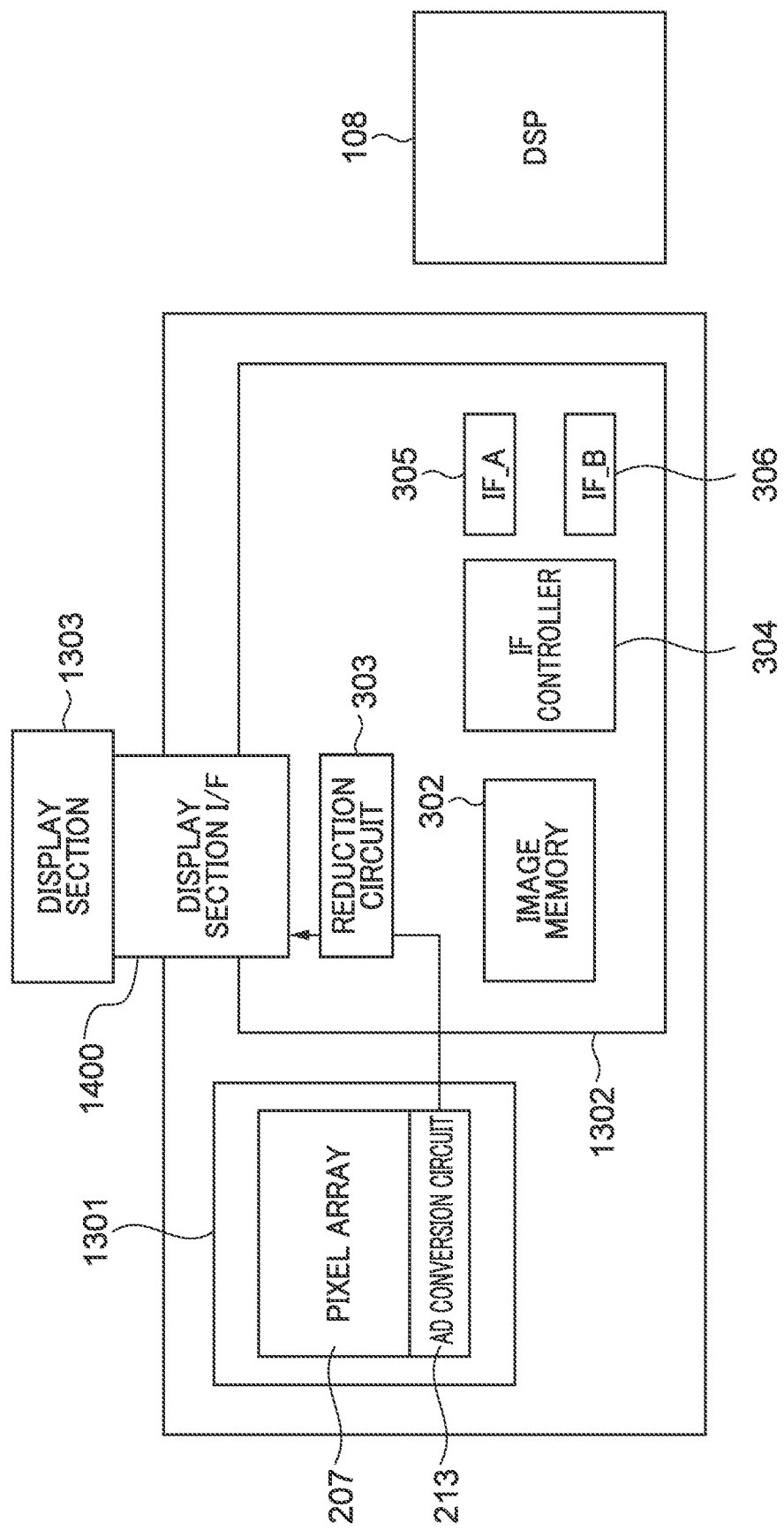
FIG. 14B is a schematic explanatory diagram of a data path for a reduced still image in the image capturing circuit according to the fifth embodiment.
Figure 14C:
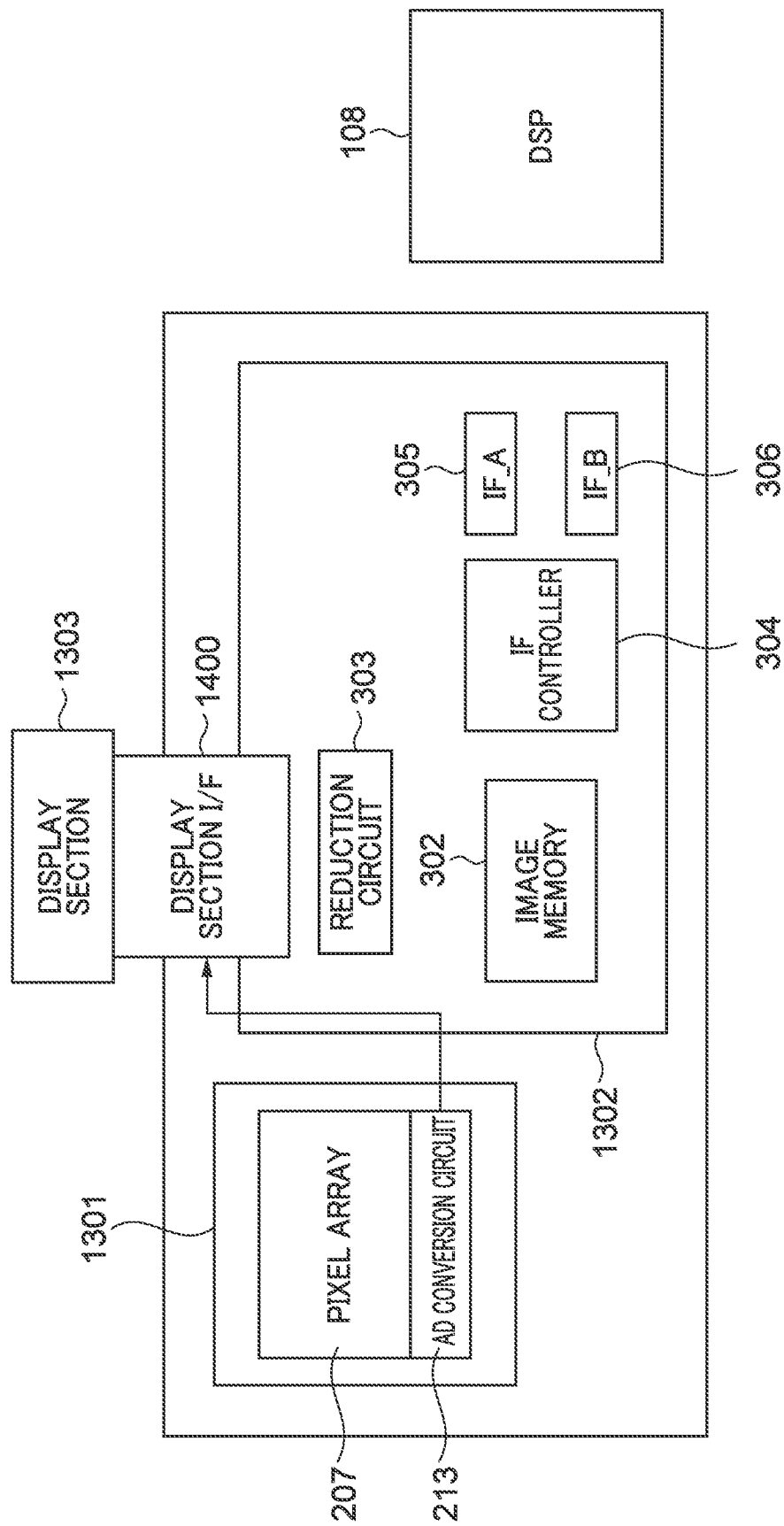
FIG. 14C is a schematic explanatory diagram of a data path for an LV moving image in the image capturing circuit according to the fifth embodiment.

FIGS. 14A to 14C are schematic explanatory diagrams of data paths for a still image, a reduced still image, and an LV moving image, respectively. The data path through which data of each of a still image, an LV moving image, and a reduced still image is output to the outside of the image capturing circuit board will be described with reference to FIGS. 14A to 14C. FIG. 14A is a schematic explanatory diagram of data paths through which a still image passes. Analog image signals of the still image output from the pixel array 207 are converted to digital image data by the ADC 213 and the resulting still image data is accumulated in the image memory 302. After that, the still image is read out from the image memory 302 and output using the IF_A 305 and the IF_B 306 via the IF controller 304.

FIG. 14B is a schematic explanatory diagram of a data path through which a reduced still image passes. Analog image signals of the still image output from the pixel array 207 are converted to digital image data by the ADC 213 and the resulting still image data is input to the reduction circuit 303. The reduction circuit 303 performs reduction processing on the input still image data. As described in the first embodiment, the reduced still image may have any resolution. In the present embodiment, it is preferable that the reduced still image has a resolution substantially equal to the resolution of the LV moving image. The reduced still image formed by the reduction circuit 303 is thereafter output to the display section 1303 via an display section interface (IF) 1400. Therefore, in a case where the reduction circuit 303 reduces the still image only in the horizontal direction, the display section 1303 is required to reduce the still image in the vertical direction. By causing the reduction circuit 303 to reduce the still image to the same resolution as the LV moving image, the display section 1303 is not required to have the image reduction function.

FIG. 14C is a schematic explanatory diagram of a data path through which an LV moving image passes. Analog image signals of the LV moving image read out from the pixel array 207 are converted to digital image data by the ADC 213 and the resulting LV moving image data is output to the display section 1303 via the display section IF 1400. By designing the data path for each image as shown in FIGS. 14A to 14C, the need of transmitting the reduced still image and the LV moving image to the DSP 108 is eliminated. With this configuration, it is also possible to lower the data transfer rate of each of the IF_A 305 and the IF_B 306. Thus, by lowering the data transfer rate required by the interface, it is possible to reduce the circuit scale of the interface and reduce the power consumption and the manufacturing costs.

Figure 15:
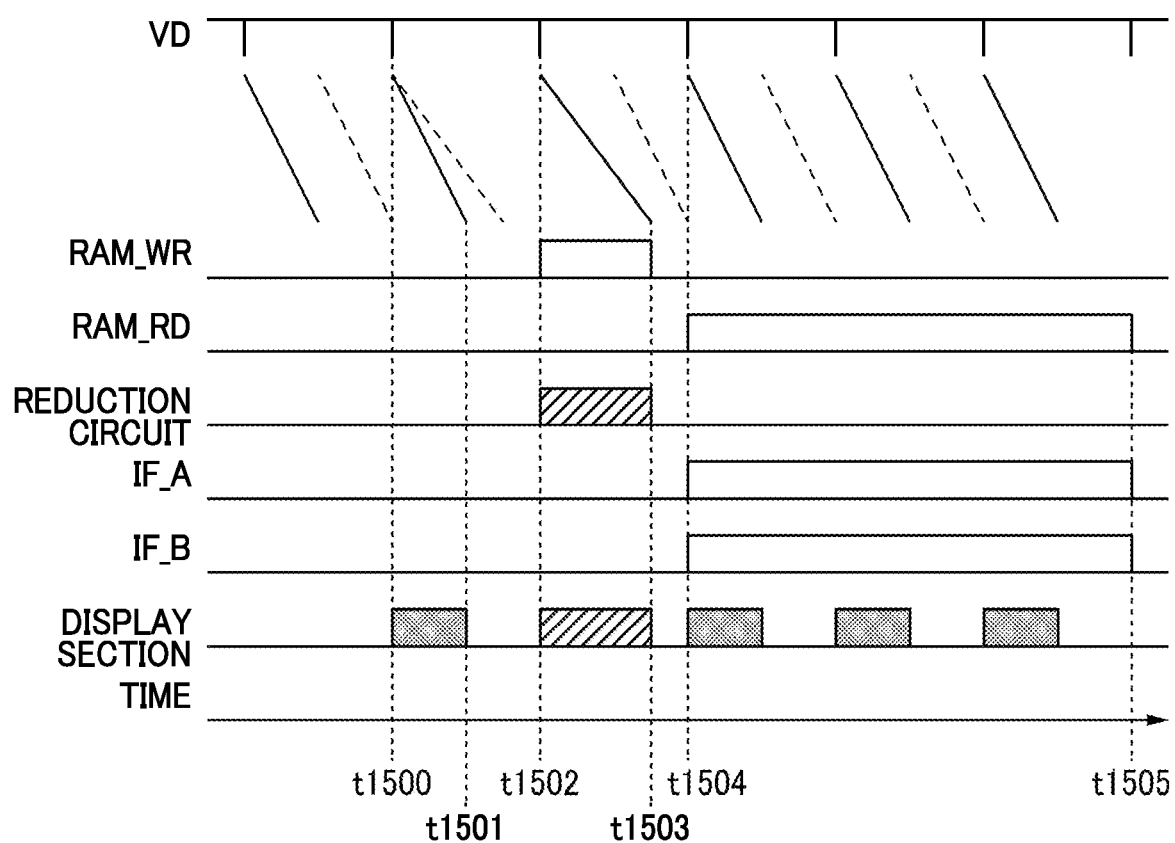
FIG. 15 is a timing diagram of an image capturing operation of the image capturing circuit according to the fifth embodiment.

FIG. 15 is a timing diagram of an image capturing operation of the image capturing circuit according to the fifth embodiment. The capturing operation for a moving image and a still image in the present embodiment will be described with reference to FIG. 15. The start of photographing a still image can be set, for example, to a timing a predetermined time period or more after a user performs the operation of pressing the still image-photographing start button included in the operation section 111. Note that out of oblique lines in FIG. 15, broken lines each represent a reset scan of each unit pixel 206 included in the pixel array 207, and solid lines each represent readout from the pixel array 207. Further, shaded boxes represent LV moving image data, white boxes represent still image data, and hatched boxes represent reduced image data.

When the vertical synchronization signal (VD) is asserted to the image capturing circuit board 1300 at a time t1500, the image capturing circuit board 1300 reads out an LV moving image. Further, simultaneously with the start of readout of the LV moving image, the image capturing circuit board 1300 outputs the LV moving image to the display section 1303 via the display section IF 1400. At a time t1501, readout of the LV moving image is completed, and data transfer from the display section IF 1400 is completed at the same time.

When the vertical synchronization signal (VD) is asserted to the image capturing circuit board 1300 at a time t1502, the image capturing circuit board 1300 reads out a still image. Further, simultaneously with the start of readout of the still image, the image capturing circuit board 1300 starts to store the still image into the image memory 302 and input the still image to the reduction circuit 303. At this time, the data input to the reduction circuit 303 is not data once stored in the image memory 302. Therefore, a data processing rate at which the reduction circuit 303 can process data is required to be equal to or higher than the data readout rate of the still image. Further, the image memory 302 in the present embodiment is not necessarily required to allow simultaneous execution of the reading and writing operations. The reduced still image formed by the reduction circuit 303 is output to the display section 1303 via the display section IF 1400. This reduced still image can be displayed on the display section 1303, similar to the LV moving image. At a time t1503, readout of the still image is completed, and transfer of the reduced still image via the display section IF 1400 is completed at the same time.

When the vertical synchronization signal (VD) is asserted to the image capturing circuit board 1300 at a time t1504, the image capturing circuit board 1300 reads out an LV moving image. Further, simultaneously with the start of readout of the LV moving image, the image capturing circuit board 1300 outputs the LV moving image to the display section 1303 via the display section IF 1400. Further, simultaneously with this, the image capturing circuit board 1300 starts to transfer the still image stored in the image memory 302 using the IF_A 305 and the IF_B 306.

As described above, the image to be displayed on the display section 1303 is not transmitted to the DSP 108. This makes it possible to determine the data transfer rate of each of the IF_A 305 and the IF_B 306 only based on the data transfer rate of the still image. Here, for example, assuming that an IF lower in data transfer rate than in the fourth embodiment is employed, it is defined that data transfer of the still image, started at the time t1504, is completed at a time t1505. Then, a time period from the time t1504 to the time t1505 becomes longer than the time period from the time t1204 to the time t1205, indicated in FIG. 12.

According to the present embodiment, the row selection circuit 211 (readout section) reads out a still image (first image data) with the first resolution and a moving image (second image data) with the second resolution lower than the first resolution from the pixel array 207. The read still image is stored in the image memory 302. The reduction circuit 303 converts the read still image to a reduced still image (third image data) with the third resolution lower than the first resolution. Then, the still image is output to the DSP 108 (image processor) without being displayed on the display section 1303, and the LV moving image and the reduced still image are displayed on the display section 1303 without being output to the DSP 108.

As described above, with the configuration described in the present embodiment, it is possible to lower the data transfer rate required for the interface section. As a result, it is possible to employ an interface that is small in all of the circuit scale, the power consumption, and the manufacturing costs, and it is possible to provide an image capturing apparatus that can photograph a still image without interrupting the live view moving image.

As shown in FIG. 6A, the pixel array 207 and the reduction circuit 303 (conversion section) can be provided on the same circuit board 600. Further, as shown in FIG. 3C, the pixel array 207 and the reduction circuit 303 (conversion section) can also be provided on the different circuit boards 300 and 301, respectively, and the circuit boards 300 and 301 can be laminated to form the single chip 107. Further, as shown in FIG. 6B, the pixel array 207 and the reduction circuit 303 (conversion section) can also be provided on the same circuit board 601 and in the different chips 602 and 604.

Further, as shown in FIG. 6A, the pixel array 207 and the image memory (memory) 302 can be provided on the same semiconductor circuit board 600. As shown in FIG. 3C, the pixel array 207 and the image memory (memory) 302 can also be provided on the different semiconductor circuit boards 300 and 301 and the semiconductor circuit boards 300 and 301 can be laminated to form the single chip 107. Further, as shown in FIG. 6B, the pixel array 207 and the image memory (memory) 302 can also be provided on the same circuit board 601 and in the different chips 602 and 603.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-007149 filed Jan. 20, 2022, which is hereby incorporated by reference herein in its entirety.

What is claimed is:

1. An image capturing circuit that can be applied to an image capturing apparatus, the image capturing circuit comprising:
   a pixel array including a plurality of photoelectric conversion elements arranged in a matrix;
   a readout section configured to read out first image data with a first resolution and second image data with a second resolution lower than the first resolution from the pixel array;
   a memory configured to store the first image data read out by the readout section from the pixel array;
   a conversion section configured to convert the first image data read out by the readout section from the pixel array to third image data with a third resolution lower than the first resolution;
   a first interface;
   a second interface;
   a control section
      configured to cause a display to display the second image data output using at least one of the first interface or the second interface or the third image data output using at least one of the first interface or the second interface, and
      configured to switch between a first transmission mode and a second transmission mode, when performing an operation of (i) inputting the first image data read out by the readout section from the pixel array to the conversion section while simultaneously writing the first image data into the memory, (ii) outputting the first image data read out from the memory and the second image data and the third image data read out by the readout section from the pixel array without being written into the memory, and (iii) causing the display to display the output second image data and the output third image data,
   wherein the first transmission mode is a mode for outputting the second image data and the third image data using both of the first interface and the second interface, and for outputting the first image data using both of the first interface and the second interface during a blanking period of the second image data or the third image data, and
   the second transmission mode is a mode for outputting the first image data using the first interface and outputting the second image data and the third image data using the second interface.

2. The image capturing circuit according to claim 1, wherein the image capturing circuit has a first camera mode and a second camera mode, and
   wherein the image capturing circuit uses the first transmission mode in the first camera mode and uses the second transmission mode in the second camera mode.

3. The image capturing circuit according to claim 1, wherein the third resolution is equal to the second resolution.

4. The image capturing circuit according to claim 1, wherein the third resolution is lower than the first resolution and higher than the second resolution.

5. The image capturing circuit according to claim 1, wherein a time period required to read out the first image data from the pixel array is longer than a time period required to read out the second image data from the pixel array.

6. The image capturing circuit according to claim 1, wherein the first image data is a still image,
   wherein the second image data is a live view moving image, and
   wherein the third image data is a reduced still image.

7. A method of controlling an image capturing circuit that can be applied to an image capturing apparatus, the image capturing circuit comprising: a pixel array including a plurality of photoelectric conversion elements arranged in a matrix; a memory; a conversion section configured to convert image data read out from the pixel array; a first interface; and a second interface,
   the method comprising:
   reading out first image data with a first resolution from the pixel array;
   reading out second image data with a second resolution lower than the first resolution from the pixel array;
   storing the first image data read out from the pixel array in the memory;
   converting, by the conversion section, the first image data read out from the pixel array to third image data with a third resolution lower than the first resolution while simultaneously writing the first image data into the memory;
   causing a display to display the second image data output using at least one of the first interface or the second interface or the third image data output using at least one of the first interface or the second interface; and
   switching between a first transmission mode and a second transmission mode, when performing an operation of (i) inputting the first image data read out from the pixel array to the conversion section while simultaneously writing the first image data into the memory, (ii) outputting the first image data read out from the memory and the second image data and the third image data read out from the pixel array without being written into the memory, and (iii) causing the display to display the output second image data and the output third image data,
   wherein the first transmission mode is a mode for outputting the second image data and the third image data using both of the first interface and the second interface, and for outputting the first image data using both of the first interface and the second interface during a blanking period of the second image data or the third image data, and
   the second transmission mode is a mode for outputting the first image data using the first interface and outputting the second image data and the third image data using the second interface.

* * * * *